(12) United States Patent
Reid

(10) Patent No.: US 11,833,950 B2
(45) Date of Patent: Dec. 5, 2023

(54) TRAILER WITH POSITIONING SYSTEM

(71) Applicant: Futura IP Limited, Auckland (NZ)

(72) Inventor: Glen Reid, Auckland (NZ)

(73) Assignee: FUTURA IP LIMITED, Auckland (NZ)

( * ) Notice: Subject to any disclaimer, the term of this patent is extended or adjusted under 35 U.S.C. 154(b) by 63 days.

(21) Appl. No.: 17/119,603

(22) Filed: Dec. 11, 2020

(65) Prior Publication Data
US 2021/0178954 A1    Jun. 17, 2021

Related U.S. Application Data

(60) Provisional application No. 62/946,715, filed on Dec. 11, 2019.

(51) Int. Cl.
*B60P 1/02*     (2006.01)
*B62D 63/08*    (2006.01)

(52) U.S. Cl.
CPC .............. *B60P 1/027* (2013.01); *B62D 63/08* (2013.01); *B60G 2300/04* (2013.01)

(58) Field of Classification Search
CPC ... B60P 1/027; B60G 17/052; B60G 2300/04; B62D 63/08
See application file for complete search history.

(56) References Cited

U.S. PATENT DOCUMENTS

| | | | | |
|---|---|---|---|---|
| 2,179,477 | A * | 11/1939 | Berendsen | B62D 53/062 267/246 |
| 2,762,631 | A * | 9/1956 | Entz | B60P 1/02 280/43.11 |
| 2,934,228 | A * | 4/1960 | Hillberg | B60P 1/025 414/458 |
| 2,990,966 | A * | 7/1961 | Schramm | B60P 1/025 414/483 |
| 3,574,388 | A * | 4/1971 | Stone | B60P 3/04 280/43.23 |
| 3,784,218 | A * | 1/1974 | Stone | B60P 3/32 280/43.23 |
| 4,008,902 | A * | 2/1977 | Dill | B60P 1/025 280/43.23 |
| 4,286,797 | A * | 9/1981 | Mekosh, Jr. | B62D 53/068 280/149.2 |
| 4,372,572 | A * | 2/1983 | Verschage | B60P 1/027 414/495 |
| RE32,736 | E * | 8/1988 | Lovell | B60G 5/00 180/41 |

(Continued)

FOREIGN PATENT DOCUMENTS

NZ        591000        12/2013

OTHER PUBLICATIONS www.airbaggedtrailers.com.

(Continued)

*Primary Examiner* — Paul N Dickson
*Assistant Examiner* — Timothy Wilhelm
(74) *Attorney, Agent, or Firm* — Dinsmore & Shohl LLP

(57) ABSTRACT

Certain aspects of the present disclosure provide a trailer, including: a chassis and a plurality of positioning assemblies, each positioning assembly including a positioning arm configured to move between a first position in which the chassis is in a lowered position and a second position in which chassis is in a raised position.

20 Claims, 15 Drawing Sheets

(56) References Cited

U.S. PATENT DOCUMENTS

| | | | | |
|---|---|---|---|---|
| 4,838,566 | A * | 6/1989 | Baxter | B60G 5/00 |
| | | | | 180/209 |
| 4,900,055 | A * | 2/1990 | Wright | B60G 5/00 |
| | | | | 280/6.15 |
| 5,013,056 | A * | 5/1991 | Landoll | B60P 1/18 |
| | | | | 414/475 |
| 5,161,814 | A * | 11/1992 | Walker | B60P 1/022 |
| | | | | 280/43.24 |
| 5,195,764 | A * | 3/1993 | Schantz | B60P 1/027 |
| | | | | 280/43.23 |
| 5,887,880 | A * | 3/1999 | Mullican | B60G 9/00 |
| | | | | 280/789 |
| 5,975,828 | A * | 11/1999 | Weldy | B60P 1/08 |
| | | | | 414/812 |
| 6,135,700 | A * | 10/2000 | Collins | B60P 3/07 |
| | | | | 280/43.23 |
| 6,152,486 | A * | 11/2000 | Pierce | B60G 17/005 |
| | | | | 280/755 |
| 6,474,672 | B1 * | 11/2002 | Briscese | B62D 63/061 |
| | | | | 280/43.23 |
| 6,592,139 | B1 * | 7/2003 | Shanahan | B60P 1/027 |
| | | | | 280/491.2 |
| 6,702,310 | B2 * | 3/2004 | Browning | B60G 17/005 |
| | | | | 248/200 |
| 7,243,979 | B1 * | 7/2007 | Stene | B60P 1/027 |
| | | | | 296/181.3 |
| 7,401,804 | B1 * | 7/2008 | Rupp | B62D 61/12 |
| | | | | 280/43.1 |
| 7,503,414 | B2 * | 3/2009 | Pierce | B62D 53/068 |
| | | | | 180/209 |
| 7,534,083 | B2 * | 5/2009 | Trudeau | B62D 63/061 |
| | | | | 414/483 |
| 7,540,528 | B2 * | 6/2009 | Spainhower | B62D 63/062 |
| | | | | 280/415.1 |
| 7,618,227 | B2 * | 11/2009 | Smith | B60P 1/027 |
| | | | | 280/43.23 |
| 7,740,258 | B2 * | 6/2010 | Saieg | B62D 53/068 |
| | | | | 280/149.2 |
| 7,743,871 | B2 * | 6/2010 | Chien | B60G 17/01933 |
| | | | | 180/282 |
| 7,926,609 | B2 * | 4/2011 | Kusaka | B60G 99/004 |
| | | | | 180/274 |
| 8,172,248 | B2 * | 5/2012 | Groves | B60P 1/027 |
| | | | | 280/490.1 |
| 8,267,410 | B1 * | 9/2012 | Stutz | B60G 5/00 |
| | | | | 280/43.23 |
| 8,272,829 | B1 * | 9/2012 | Rupp | B60P 1/027 |
| | | | | 414/485 |
| 8,317,215 | B2 * | 11/2012 | Quenzi | B62D 53/065 |
| | | | | 280/425.2 |
| 8,328,211 | B2 * | 12/2012 | VanDenberg | B60G 9/003 |
| | | | | 280/124.128 |
| 8,820,767 | B1 * | 9/2014 | Osborne | B60G 11/225 |
| | | | | 280/43.13 |
| 9,205,881 | B2 * | 12/2015 | Vandergon | B60G 99/00 |
| 9,340,087 | B2 * | 5/2016 | Atkinson | B62D 33/037 |
| 9,428,027 | B2 * | 8/2016 | Iliuta | B60P 1/027 |
| 9,623,780 | B2 * | 4/2017 | Pratt | B62D 53/062 |
| 9,969,234 | B2 * | 5/2018 | Osborne | B60G 5/00 |
| 9,994,270 | B2 * | 6/2018 | Blevins | B60G 3/18 |
| 10,370,033 | B1 * | 8/2019 | Klein | B62D 21/20 |
| 10,654,534 | B2 * | 5/2020 | Kamm | B62D 63/025 |
| 11,021,199 | B2 * | 6/2021 | Linkletter | B62D 63/08 |
| 2005/0184485 | A1 * | 8/2005 | Timmermans | B60P 1/027 |
| | | | | 280/43.1 |
| 2006/0045693 | A1 * | 3/2006 | Elliot | B60P 1/027 |
| | | | | 414/481 |
| 2006/0186616 | A1 * | 8/2006 | Rudiger | B60G 3/14 |
| | | | | 280/6.15 |
| 2007/0017715 | A1 * | 1/2007 | McCann | B60G 17/0523 |
| | | | | 180/290 |
| 2017/0057577 | A1 * | 3/2017 | Blevins | B60D 1/1675 |
| 2018/0215302 | A1 * | 8/2018 | Reid | B60P 1/14 |

OTHER PUBLICATIONS http://www.nevco.com.au.
www.raceking.com.au.
http://www.trailersauce.com/trailer-plans/ground-loading-trailer/introduction/.
https://www.baxleycompanies.com/Trailers.html.
http://www.motorbronx.com.
http://www.airtow.com/trailer-features/.
http://www.razortrailer.com.
http://www.combiclamp.co.nz/sheep-handling/combi-trailer/.
http://www.lift-a-load.com/lofeatures.html.
http://advancemetalworking.com/drop-deck-trailer/.
Motorbronx Racing MR 500 Cobra trailer product literature.
"Futura Trailers Lowering & Loading Porsche 911," https://www.youtube.com/watch?v=LeQHRK5qjRc, last accessed Jan. 2023.
"Early design of the Futura Lowering Trailer," https://www.youtube.com/watch?v=Zz_wbp8ANeA, last accessed Jan. 2023.
"Futura Lowering Race Car Trailer RX7," https://www.youtube.com/watch?v=kEMEu1PcrWY, last accessed Jan. 2023.
"Futura Trailers Tandem Lowering Trailer for V8 Supertourer," https://www.youtube.com/watch?v=5XejIY-NB-s, last accessed Jan. 2023.
"Renegade Trailer Website," https://web.archive.org/web/20150113095352/http://www.renegadetrailers.co.nz/, last accessed Jan. 2023.
"Tandem Axle Car Transporter T45195," https://web.archive.org/web/20150705030457/http://www.renegadetrailers.co.nz/tandem-axle-car-transporter-T45195, last accessed Jan. 2023.
https://www.raceking.com.au/.

\* cited by examiner

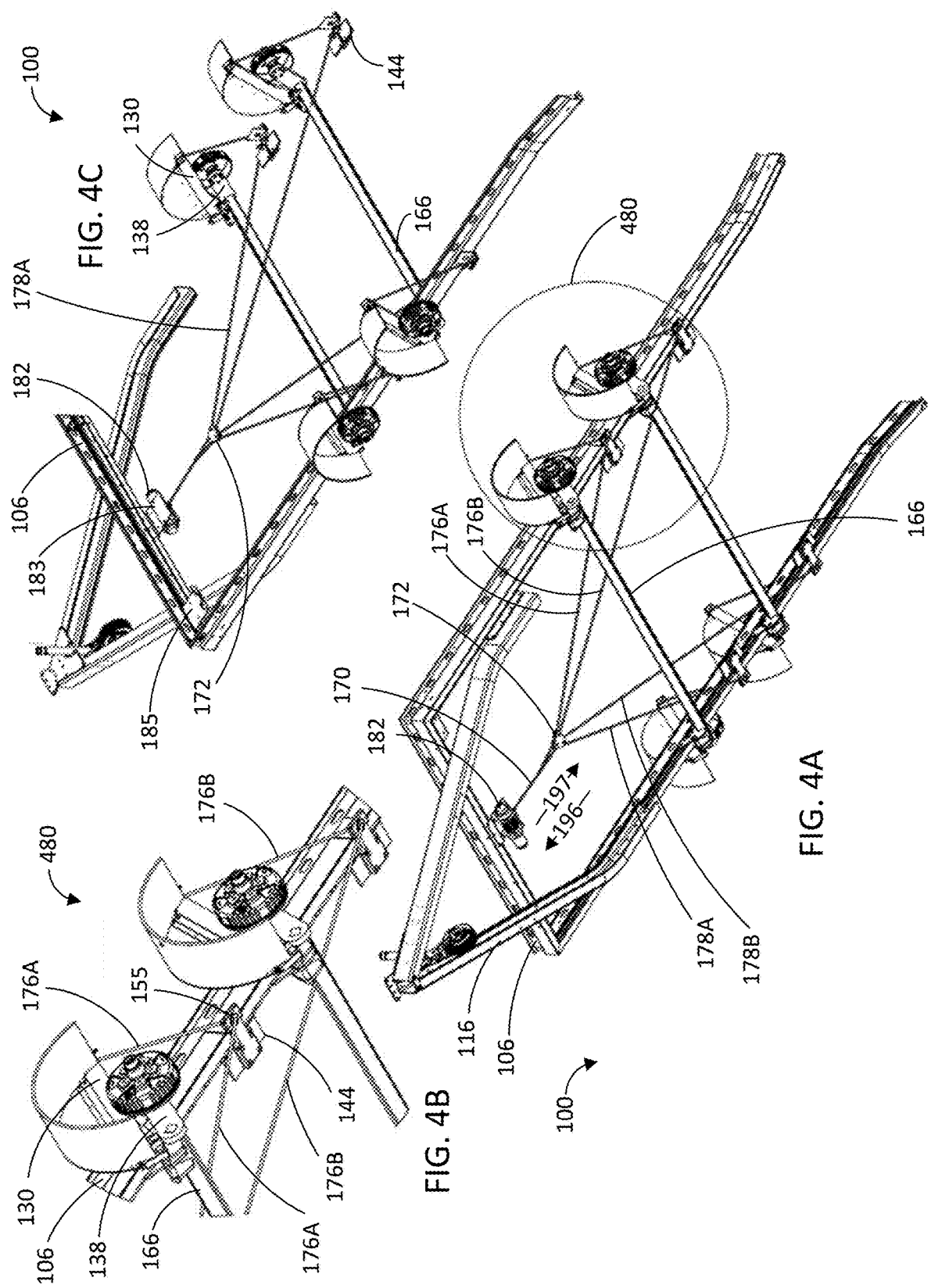

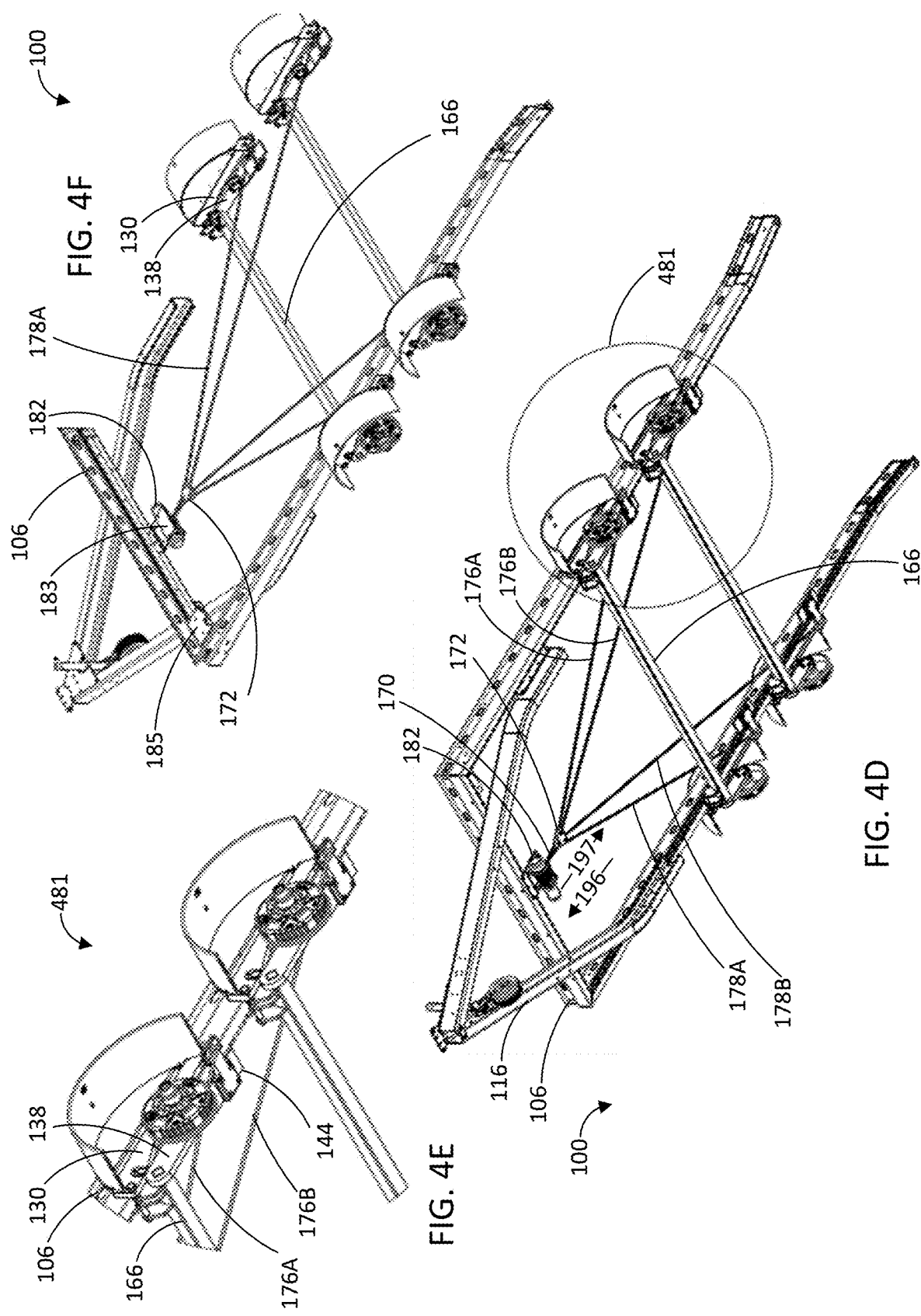

TRAILER WITH POSITIONING SYSTEM

CROSS-REFERENCE TO RELATED APPLICATIONS

This Application claims the benefit of and priority to U.S. Provisional Patent Application No. 62/946,715, filed on Dec. 11, 2019, the entire contents of which are incorporated herein by reference.

BACKGROUND

The following disclosure relates to the field of trailers, such as those that can be pulled by consumer and commercial vehicles.

Trailers have long been used for moving loads, large and small, behind vehicles, such as consumer and commercial vehicles. Generally, trailers have one or more sets of wheels that allow the trailer to roll freely behind a towing vehicle. And like vehicles, the chassis and/or deck or a trailer is generally elevated from the ground in order that the trailer has clearance to negotiate obstacles, uneven surfaces, etc.

An issue that arises with trailers, however, is that the load bearing portion of the trailer, such as the deck, needs to have sufficient ground clearance for safe and effective operation in many environments, such as on- and off-road. Consequently, any load that is to be placed on the trailer needs to be first lifted to the level of, for example, the deck. For large and/or heavy loads, this can be problematic for an individual user and may require additional (and sometimes heavy) machinery.

A ramp is one solution to the aforementioned problem of getting large and/or heavy loads onto a trailer. For example, one or more ramps may be used to roll large and/or heavy loads, such as an automobile or other vehicle, onto the deck of a trailer. While ramps work well in this manner, their use is not without important compromises. For example, the ramps must usually be transported along with the trailer so that the load may subsequently be unloaded via the ramps. And the need to transport the one or more ramps with the trailer may add significant weight and take up significant space on the trailer, limiting the effective load capacity of the trailer.

Another issue with using a ramp to load a trailer is the angle of the ramp with respect to the ground. For example, where a vehicle with a small ground clearance is to be loaded onto a trailer with a large ground clearance via ramps, those ramps may need significant length in order to reduce the approach angle so that the vehicle can negotiate the ramps without impediment. Unfortunately, increasing the length of the ramps increases the weight and spatial volume of the ramps, which increases the burden of using and carrying them.

Accordingly, there is a need for trailers that can be loaded more easily without having to carry significant additional equipment, such as ramps, and which can accommodate loads with limited ground clearance.

SUMMARY

As first aspect provides a trailer, including: a chassis; a plurality of positioning assemblies, wherein each positioning assembly of the plurality of positioning assemblies comprises: a positioning arm comprising a positioning cable connection element, wherein: the positioning arm is configured to move between a first position in which the chassis is in a lowered position and a second position in which chassis is in a raised position via action of a positioning cable attached to the positioning cable connection element, and the positioning arm is connected to an axle tube; and a suspension arm connected to a torsion axle tube, wherein the torsion axle extends at least partially into the axle tube; a plurality of positioning cables, wherein each positioning cable of the plurality of positioning cables is connected to at least one positioning arm of one positioning assembly of the plurality of positioning assemblies; and a device configured to cause the positioning cables to move between a first cable position in which the chassis is in a lowered position and a second cable position in which chassis is in a raised position.

BRIEF DESCRIPTION OF THE DRAWINGS

FIGS. 4A-4C depict different isometric views of a trailer in a lowered position without a trailer deck.

FIGS. 4D-4F depict different isometric views of a trailer in a raised position without a trailer deck.

DETAILED DESCRIPTION OF CERTAIN INVENTIVE EMBODIMENTS

Figure 1A:
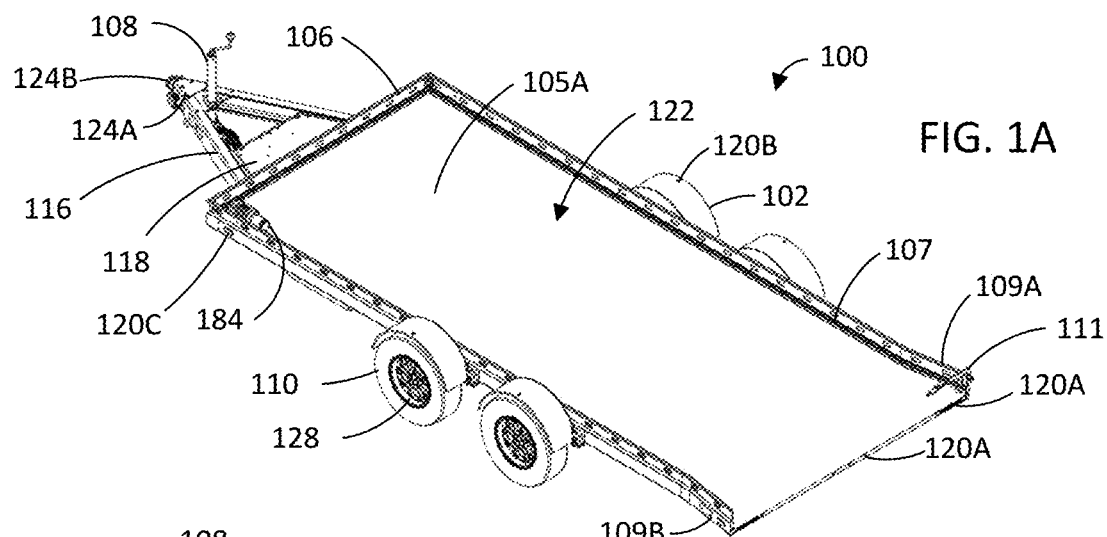
FIGS. 1A-1B depict isometric and plan views of a trailer in a raised position.

Disclosed herein are trailers that improve upon the performance of existing trailer designs.

One performance consideration of a trailer is how much load it can carry. To this end, trailers usually have load ratings, such as a Gross Vehicle Weight Rating (GVWR) or Gross Vehicle Mass (GVM), which refer to the amount of weight the trailer can carry as a load. Because the load rating of a trailer typically accounts for the weight of the trailer itself, the weight of the trailer effectively reduces the load capacity of the trailer, i.e. the weight of the load the trailer can carry. For example, a trailer's structure, such as its chassis, deck, axles, wheels, railing, etc., as well as its accessories, such as its parking jack, lights, tool mounts, tool boxes, integrated or removable ramps, etc., collectively its non-load weight, all reduce the load capacity of the trailer relative to the trailer's load rating. Consequently, it is desirable to reduce the non-load weight of the trailer so the load capacity may be maximized for any given trailer load rating.

Another performance consideration of a trailer is how easy it is to use for its intended purpose—namely moving a load from place to place. For example, if a trailer is meant to carry a vehicle as its load, then how easily the trailer can load and unload the vehicle is an important performance consideration. As discussed above, the need to carry and use special accessories, such as ramps, in order to use a trailer for its intended purpose is an important limitation on the ease of use of the trailer. In particular, because ramps must be able to support the weight of the load being placed on the trailer, such as a vehicle, the ramps themselves are usually large and heavy accessories, which may be unwieldy for a user.

Trailers exist that may be lowered in order to reduce the necessity for ramps and other accessories. However, existing trailers' lowering systems are typically based on airbag, hydraulic, or pneumatic systems. Unfortunately, such systems require substantial additional hardware on the trailer, such as pumps, valves, tanks, air lines, pneumatic lines, hydraulic lines, electronic controllers, etc. The significant increase in hardware and complexity of known lowering systems tends to result in trailers that carry more non-load weight, are difficult to use, need frequent maintenance, are prone to mechanical failure, and are very expensive.

Embodiments described herein relate to improved trailers that comprise a novel positioning system for lowering and raising the trailer chassis that is compact, simple to use, low maintenance, and reliable. In various embodiments described herein, a trailer's chassis may support, include, and/or be integral with a load bearing portion of the trailer, such as a trailer deck. Thus, in various embodiments, the chassis may generally include aspects of the trailer inside the positioning arms that are raised and lowered by the positioning system. While trailer decks are depicted and described in various examples herein, in other embodiments, loads may be supported directly by a chassis that does not have a traditional deck surface. For example, mounts or other structural elements may be configured to engage specialized loads. In some embodiments, the deck, or portions thereof may be removable to accommodate specialized loads.

Further, as used herein, raising and lowering the chassis and/or trailer deck may generally refer to changing the height and/or angle of the chassis and/or trailer deck. For example, when lowering a trailer chassis and/or trailer deck, the loading end of the trailer may lower until it contacts the ground while the non-loading end may remain relatively fixed in height, or may move over a smaller path, as shown in various figures described herein. Beneficially, the positioning system described herein may be operated with a single device, such as a winch or other type of actuator, to move a compact cabling system that in-turn causes the trailer to raise or lower via positioning arms. Because the system is primarily mechanical and has relatively few moving parts, it is easy to use, reliable, and requires little maintenance. Further, the compactness of the systems in both part size and count means that the system is lightweight and relatively inexpensive.

The improved trailers described herein include many advantageous features, including, for example: narrow, solid-bodied positioning arms that allow for a wider trailer chassis and/or deck; torsion axles that eliminate the need for leaf springs and improve ride quality; suspension arms that provide more ground clearance and allow the axles to be placed further back along the length of the chassis, which improve trailer handling; direct pull positioning cables and guide rings, which eliminate the need for most pulleys any thereby simplify the mechanical design, reduce weight, and reduce points of failure; synthetic positioning cables, which are lower maintenance and quieter to use; a positioning system actuator (e.g., a winch) mounting location beneath the loading portion of the trailer (e.g., beneath the trailer deck), which reduces the angle of the control cable with respect to cable routing elements and allows for better clearance of axles; flared trailer deck ends, which allow easier approach and loading; easily removable fenders to allow easy access to loads; and other features as further described herein.

Example Aspects of Improved Trailers

The trailer positioning system described herein enables a loading end of a trailer deck to be lowered to ground level for loading and then raised for transporting the load. Because the loading end of the trailer deck can be lowered to ground level, in various embodiment, the trailer deck itself may be used as a ramp for loading the trailer, which may in-turn obviate the need for carrying ramps. By eliminating the need for ramps to be used and subsequently carried with the trailer, the trailer is easier to use. For example, a user of an improved trailer described herein may enjoy the benefit of not having to unload, deploy, and then reload ramps for use as with a traditional trailer. Further, the load capacity of the trailer relative to its load rating is beneficially increased as well as the amount of load space available on the trailer because the weight and space of auxiliary ramps are unnecessary. Further, the efficiency of using the trailer may be beneficially increased given the reduction in non-load weight (e.g., better fuel mileage for the vehicle towing the trailer).

Trailers described herein may include a jack assembly connected to a caster wheel (also known as a jockey wheel), which may be used to raise or lower the non-loading end of trailer. For example, a jack assembly may be used to lower a caster wheel to support the front of a trailer when the trailer is decoupled from a tow vehicle. Conversely, the jack assembly may be used to raise the caster wheel when the trailer is coupled to a tow vehicle and thereby supported by the tow vehicle's hitch. The caster wheel may further be removable so as to improve the ground clearance of the trailer when in operation and to reduce wear and tear on the caster wheel and jack assembly. Alternatively, the jockey wheel may be configured to pivot or rotate to a stowed position during towing so that it need not be removed and replaced.

Trailers described herein also comprise a chassis, which in various embodiments comprises a variety of chassis elements, such as drawbars, rails, and other supporting structures. In some embodiments, a trailer comprises a chassis adapted to support a trailer deck. The trailer deck may comprise, for example, planks, tracks, plates, or other elements to support a load. In some embodiments, the chassis and trailer deck may be considered a single functional unit once connected together such that the chassis may be considered part of the structure of the deck and vice versa.

In other embodiments, the trailer chassis is configured for supporting a load directly in such a way that no deck is necessary.

Chassis and trailer decks may be made of any strong and preferably lightweight material, such as a metal or composite material. In some embodiments, one or both of the chassis and the trailer deck are made from aluminum or an aluminum alloy. In other embodiments, one or both of the chassis and the trailer deck may be made from a composite material, such as a carbon fiber composite material.

Embodiments of trailers described herein may further comprise chassis elements of the chassis that extend from a hitch receiver and along the sides of the trailer deck. In particular, in the depicted embodiments, the chassis elements may extend and act as side-support elements for the deck.

Embodiments of trailers described herein may further comprise trailer decks with two distinct portions, including a level deck portion and an angled deck portion. The level deck portion is generally substantially horizontal or level when the trailer is in the raised position (assuming the trailer is on generally level ground), provided, however, that unbalanced loads on the trailer may cause the level trailer deck portion to be out of level during operation. The angled deck portion (alternatively referred to as the trailer deck angled portion) is purposefully angled below the horizontal both when the trailer is in the raised or lowered position, which provides an advantageous approach angle (i.e., the angle formed between the angled trailer deck portion and the ground) for a load being moved up the trailer deck from ground level. For example, in some embodiments, the approach angle (which may alternatively be referred to as the trailer deck angled portion ground inclination angle) may be equal to or less than 3 degrees, 2 degrees, in a range of 2-4 degrees, or the like. The low approach angle allows for the trailers described herein accommodate loads with relatively low ground clearances and/or very shallow available approach angles, such as vehicles that sit low to the ground and/or have elements protruding from their loading ends that further reduce available approach angles. In this way, the angled deck portion acts as an integrated ramp for the trailers described herein, without the need to deploy additional, standalone ramps.

In some embodiments, the angled deck portion is shorter in length than the level deck portion, as measured down the long axis of the trailer deck (e.g., from non-loading end to loading end). In such embodiments, the longer, level deck portion may generally include more supporting structures below the top surface of the trailer deck, such as weight supporting beams, or other structural components and/or accessories. In other embodiments, the length of the level deck portion relative to the angled trailer deck portion may be different. For example, in alternative embodiments, the level and angled deck portions may be approximately equal in length, or the angled deck portion may be longer than level deck portion. In yet further embodiments, the trailer deck may be at an angle relative to ground level across its entire length.

In some embodiments, the level and angled deck portions are distinguished by an intersection where the angle of one portion changes directly to the angle of the other portion without significant transition. However, in other embodiments, the transition from one trailer deck portion to another may be gradual, such as a curved or stepped transition over a set length or radius of curvature.

While trailer deck embodiments with two portions (e.g., level and angled) have been described, other embodiments of trailer decks could have more than two distinct portions, e.g., three or more distinct portions. In yet other embodiments, a trailer deck may transition from an angled portion to a level portion without definitive transition points, such as by way of a relatively large radius curvature from loading end to non-loading end.

Trailer decks (and portions thereof) may include surface treatments, such as texturing, ridges, groves, stippling, high grip surface coatings, and others in order to provide grip to loads (and users) on the trailer deck. In some embodiments, different trailer deck portions (e.g., level and angled) may have different surface treatments, while in others the surface treatment of each may be the same.

In some embodiments, a trailer chassis and/or deck may also include one or more attachment points for mounting straps, cables, or the like in order to secure a load on the trailer deck and prevent it from moving while the trailer is moving. In some embodiments, the attachment points may be raised or counter-sunk with respect to the trailer deck, such as mounting brackets, flanges, hooks, or rings. In some embodiments, the attachment points may be apertures in the trailer chassis and/or deck, such as apertures in the deck or chassis railing.

Embodiments of trailer chassis described herein may also comprise rails projecting above the level of the trailer deck, which may run along one or more sides of the deck, including the front, left, and/or right sides. The rails may also project below the level of the deck and provide attachment points and support for a trailer deck.

Embodiments of trailers described herein may further comprise tires and fenders (which may alternatively be referred to as tire guards or mud guards). In various embodiments described herein, the fenders may be removable to allow easy access to other trailer parts for servicing, and may also improve access to vehicles or other equipment loaded on the trailer.

Embodiments of trailers described herein may further comprise lights, which may be single or multi-element lights, and which may indicate braking, turning, reversing, and the like. In some embodiments, the lights may be integrated into other aspects of the trailer, such as rails, the trailer chassis and/or deck, fenders, and other aspects of the trailers described herein. In some embodiments, small and power efficient LEDs may be used for various lighting elements.

Embodiments of trailers described herein may further comprise hitch receivers connected to elements of a chassis. A hitch receiver may be used to connect a trailer to a tow vehicle with a compatible tow hitch, such as a tow hitch ball or the like. Notably, the hitch receivers depicted in the various embodiments are just some options, and other types of hitch receivers, such as couplers, rings, and others are possible. Hitch receivers may be permanently or removably affixed to the chassis of a trailer in some embodiments. The ability to remove a hitch receiver is advantageous because it allows for customization of the type of hitch receiver used for different users, such as the use of different hitch receivers in different countries, or the use of different hitch receivers with different vehicle hitch designs, without otherwise modifying the design of trailer.

Embodiments of trailers described herein may further comprise wheels upon which tires are mounted, and brakes, which may be actuated electronically, pneumatically, or hydraulically.

Embodiments of trailers described herein may further comprise a multi-axle configuration, such as a tandem or double axle configuration with four wheels and tires, or a single axle configuration with only two wheels and tires. Still other embodiments may have more axles and/or more wheels and tires per axle as compared to the depicted embodiments. Generally, the trailer positioning system described herein is modular and may be adapted to any number of axles.

Embodiments of trailers described herein may further comprise positioning arms that are outboard of the trailer chassis in order that they may rotate up and down as the trailer is lowered and raised. Further, in some embodiments, positioning arms may be located along the length of the trailer chassis, but may not extend in front of or behind the length of the trailer chassis no matter the orientation of the trailer chassis (i.e., whether or not it is raised or lowered).

In some embodiments, the positioning arms may be solid-bodied, such that their cross-section is generally closed with material, though various apertures or other openings may be added for attaching other elements of the lower system, routing cables, and the like, as further described herein. In other embodiments, the positioning arms may be hollow despite a generally enclosed cross-section, to save weight while maintaining strength. In some embodiments, the positioning arms may be formed using an additive manufacturing process to generate contiguous shapes without the need for multiple parts, connecting hardware, or welding. Further, additive manufacturing may be used to generate interior structures that add significant strength to the positioning arms with minimal added weight, such as may be configured using generative design techniques.

Embodiments of trailers described herein may further comprise a device operable to control the position of the chassis (e.g., between raised and lowered positions). Generally, the device operable to control the position of the chassis is operable to cause a tension on one or more positioning cables so as to control the position of the chassis between the raised and lowered positions. As such, the device operable to control the position of the trailer chassis may be mounted fore (e.g., toward the non-loading end of the trailer) or aft (e.g., toward the loading end of the trailer) of a connection to the positioning cables, or in any position operable to create the required tension.

In some embodiments, the device operable to control the position of the trailer chassis is an actuator such as an electric or hydraulic actuator. The actuator may also be linear or rotational. In other embodiments, the device operable to control the position of the trailer chassis is a winch, which may be a manual or electric winch. The winch may be connected to a control cable (or winch cable) and one or more positioning cables. In some embodiments, the control cable may be connected to one or more positioning cables by means of a cable connection assembly.

In some embodiments, the device operable to control the position of the trailer chassis (e.g., winch) may be positioned below the deck surface so that the angle between the control cable and the positioning cables is minimized. In various embodiments, the device operable to control the position of the trailer chassis may be mounted to a rail of the chassis, or to the underside of the deck itself, which may further include a mounting plate between the winch and the deck surface for structural support.

Control cables and positioning cables may be made of any material of suitable strength, such as a braided steel cable, a braided fabric cable, a synthetic cable (e.g., made of NYLON®, polyester, polypropylene, aramid, or ultra-high-molecular-weight polyethylene (UHMWPE), to name a few example), a solid cable, a chain, and others. In some embodiments, the control cable and positioning cables have a circular cross-section so that they mate securely with pulleys or with guide rings. Synthetic cables are used in some embodiments because they are strong, lightweight, quiet during operation, and generally create less wear on non-moving components, such as guide rings, as compared to braded metal cables.

Embodiments of trailers described herein may further comprise locking mechanisms configured to lock the positioning arms in place. In some embodiments, these locking mechanisms may be configured to be manually operated by a user, while in others they may be electrically actuated. In some embodiments, the locking mechanism may be biased towards the locked position (e.g., by a spring) so that when the locking element (e.g., a locking pin) comes into alignment with a complementary locking structure (e.g., a locking pin aperture), it automatically deploys into the locking structure.

Embodiments of trailers described herein may further comprise one or more equipment enclosures, which in some embodiments may be mounted to chassis elements, such as mounted to drawbars of a chassis. The equipment enclosure may enclose various aspects of trailer, such as a battery, and may also be used for general storage purposes.

Equipment enclosures may generally be permanently affixed to a chassis or removably affixed. The equipment enclosure may include one or more struts so that a lid or cover to the enclosure may be propped open while accessing the interior space of enclosure. Though not depicted in the embodiments described herein, device operable to control the position of the trailer chassis, such as a winch, may be mounted within an equipment enclosure and its cable may pass out of the equipment enclosure to connect to positioning cables so as to operate the positioning system for the trailer, or it may connect to a load itself. For example, the winch cable may be routed via cable elements, such as pulleys and/or guide rings, to attach to a load to be winched up onto the trailer.

An equipment enclosure may further house electrical components of a trailer positioning system. For example, an equipment enclosure may house a battery that powers one or more electric winches, such as the trailer positioning winch and/or a recovery winch for manipulating loads on the trailer deck.

An equipment enclosure may also include a solar panel and a charging circuit in order to provide a renewable trickle charge to a battery, such that the battery maintains a useable charge at all times (so long as the solar panel is exposed to light). The solar panel may generally be mounted to increase exposure to the sun, such as on the top of a lid of the equipment enclosure, though in other embodiments it may be positioned remote from the equipment enclosure and connected to electrical components within the equipment enclosure by suitable electrical connections, such as wires.

An equipment enclosure may also include a switch to operate the device operable to control the position of the trailer chassis (e.g., a winch) and a switch to activate or deactivate the battery, such as for long term storage.

An equipment enclosure may also include a lock so that equipment within the enclosure can only be accessed by appropriate users.

In some embodiments, a trailer may include an electronic controller (e.g., stored within the equipment enclosure) connected to a signal receiver, such as an antenna, so that operation of, for example, one or more electric winches, may be controlled, for example, by wireless remote control, such as described in more detail below with respect to FIG. 12. In some embodiments, the wireless remote control may be a physical controller, while in other embodiments it may be a software controller, such as an application running on a wireless device, such as a smart phone, tablet computer, or personal computer.

An electronic controller for a trailer may further enable status monitoring of the trailer's orientation (e.g., raised or lowered) and equipment, such as charge of the battery or condition of the device operable to control the position of the trailer chassis or the load on the chassis (e.g., one or more winches), such as whether the device is operating normally or jammed. The electronic controller may also monitor and control the status of the positioning arm locking mechanisms.

In some embodiments, the equipment enclosure may include a transceiver connected to an electronic controller so that two-way communication may be established with a remote control system, such as an application running on a personal electronic device, such as a smart phone, tablet computer, or personal computer.

A trailer may also include a brake controller (e.g., within the equipment enclosure), which may interface with a vehicle directly, or which may control the operation of the brakes via some other logic, such as via detection of acceleration or deceleration forces from an acceleration sensor.

A trailer may also include a light controller (e.g., within the equipment enclosure), which may interface with a vehicle directly, or which may control the operation of the trailer's lights via some other logic.

A trailer may also include a GPS location device (e.g., within the equipment enclosure), for example powered by the battery, which provides a periodic location of the trailer for tracking and theft prevention purposes.

Embodiments of trailers described herein may also include accessories. For example, a trailer may include a wind screen (alternatively referred to as a rock guard) that protects any load on the trailer from wind and debris during operation of the trailer. In some embodiments, the wind screen may additionally provide aerodynamic improvement for the trailer during operation, such as by directing wind up and around the load, such as described with respect to FIGS. 10A-10B.

Embodiments of trailers described herein may also include an equipment rack, which may, for example, be used to carry tires, or fuel containers, or any other equipment a user desires.

Embodiments of trailers described herein may also include a device operable to control the position of a load on the trailer, such as a recovery winch. For example, a winch may be used to attach to a load, such as a vehicle, and to pull the load up onto the trailer deck. In some embodiments, the recovery winch may be powered by a battery in the equipment enclosure and may be controlled by a wired or wireless remote control.

Figure 11A:
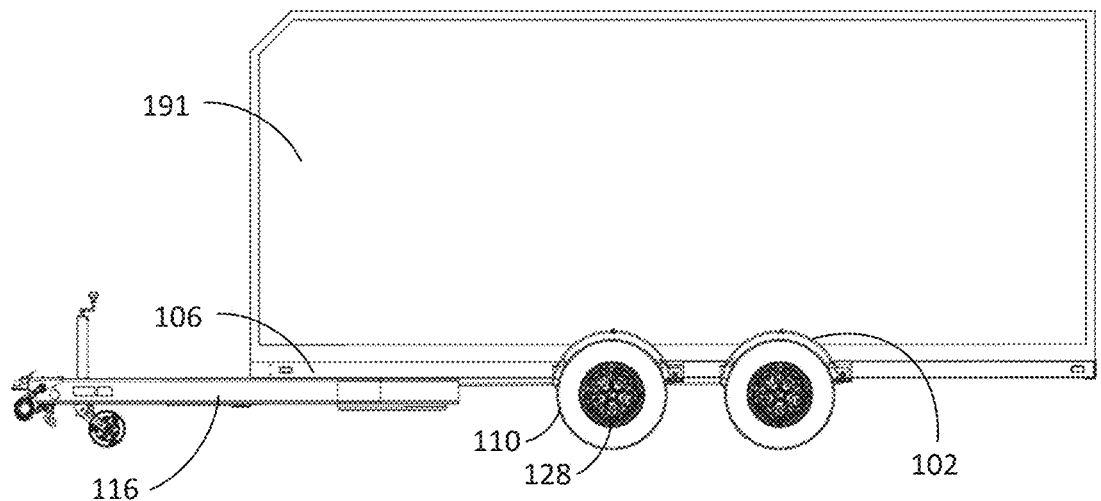
FIGS. 11A-11B depict different plan views of a trailer with a trailer deck enclosure installed.
Figure 11B:
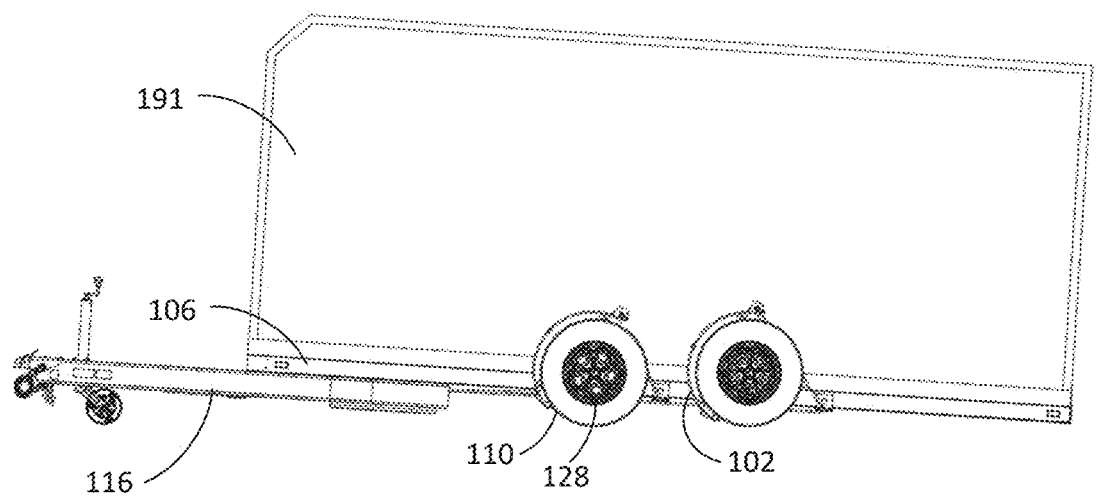

Embodiments of trailers described herein may also include a load enclosure so that any load is protected from the elements, such as described with respect to FIGS. 11A-11B. In some embodiments, the enclosure may be a fabric or other non-rigid material enclosure to lower the weight of the trailer despite providing full cover for the load. The enclosure may have access doors or flaps. For example, an access flap may zip closed or open for access to the interior of the enclosure. The load enclosure may further include enclosure support elements that interface with apertures, receptacles, or the like on the trailer so as to form a solid connection between the load enclosure and the trailer. For example, the load enclosure may include rib elements that give shape and support to the load enclosure, especially when the load enclosure is not rigid (e.g., fabric).

While the various trailer embodiments herein have been described primarily in the context of loading and unloading vehicles, the features described herein, such as the positioning system, are equally applicable to trailers usable for other purposes. For example, an improved trailer with a positioning system such as described herein may be configured to carry watercraft, such as boats, jet skis, and the like, or livestock, such as horses and cows, or specialized heavy machinery, such as tractors, and so on. Wherever placing a load on a trailer is benefited by a trailer with changeable position (e.g., from raised to lowered), then the features of the trailer embodiments described herein are beneficial.

Persons of skill in the art will appreciate that the specific embodiments described herein are exemplary only, and other embodiments with other combinations of the features described herein are possible and within the scope of this disclosure.

Trailers with Deck Positioning Systems

Figure 1B:
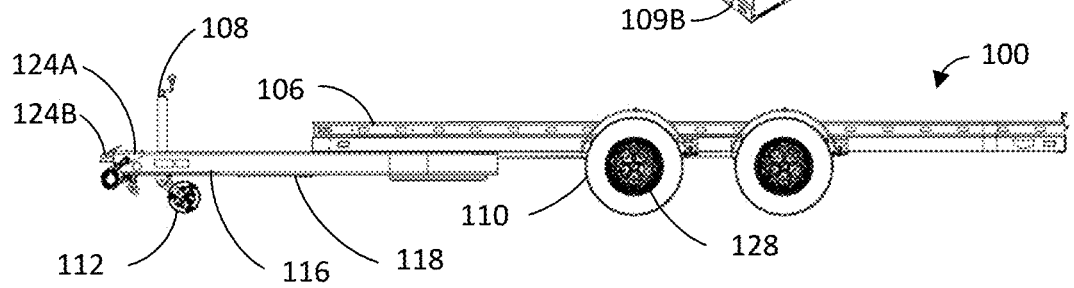
Figure 1C:
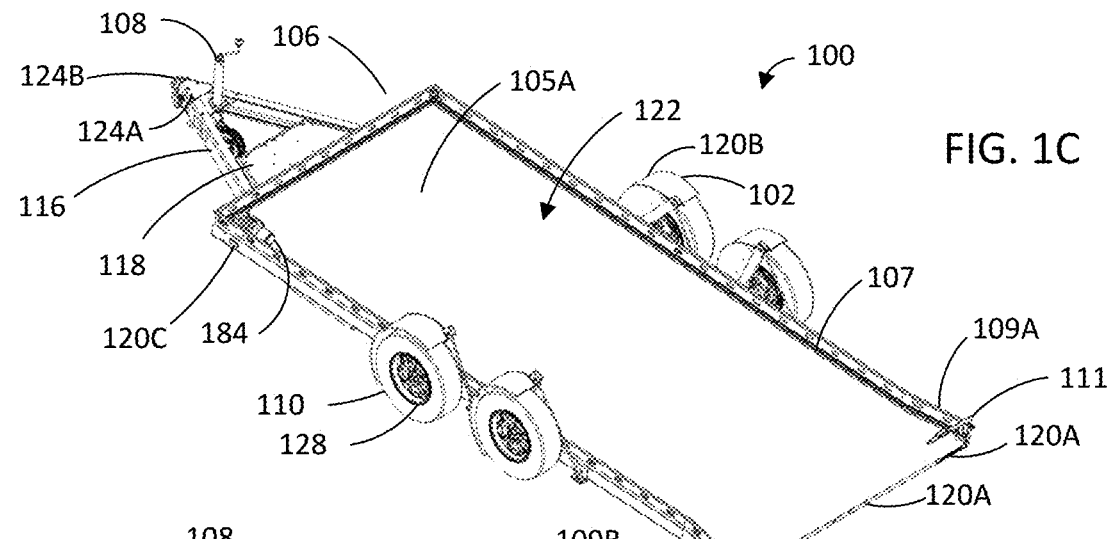
FIGS. 1C-1D depict isometric and plan views of a trailer in a lowered position.
Figure 1D:
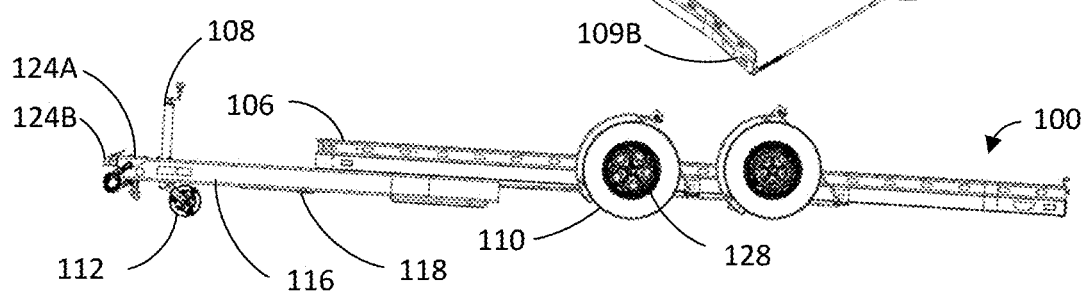

FIGS. 1A-1D depict different isometric and plan views of a trailer 100 with a positioning system in different positions. In particular, FIGS. 1A and 1B depict trailer 100 in a raised position and FIGS. 1C and 1D depict trailer 100 in a lowered position.

FIG. 1A shows a view from a position above trailer 100. In this embodiment, trailer 100 comprises a jack assembly 108 connected to a caster wheel (e.g., 112 in FIG. 1B) (also known as a jockey wheel), which may be used to raise or lower the non-loading end of trailer 100. Jack assembly 108 may be used to automatically or manually lower the caster wheel to support the front of trailer 100 when trailer 100 is decoupled from a tow vehicle. Conversely, jack assembly 108 may be used to raise the caster wheel when trailer 100 is coupled to a tow vehicle and thereby supported by the tow vehicle's hitch. In the depicted embodiment, caster wheel 112 is further configured to fold in towards trailer 100 when not in use.

Trailer 100 also comprises a chassis, which further comprises a chassis element 116, which may be referred to as a drawbar. Though not shown, at least one drawbar tie point may be attached to chassis element 116, which may be used, for example, to connect safety chains between chassis element 116 and a tow vehicle.

The chassis of trailer 100 further includes a trailer deck 122 in this embodiment, which comprises a deck top surface 105A for positioning a load, such as a vehicle, equipment, machinery, and the like. Though not depicted, deck top surface 105A may include surface treatments, such as texturing, ridges, groves, stippling, high grip surface coatings, and others in order to provide grip to loads (and users) on trailer deck 122.

Though not shown, deck top surface 105A may also include one or more attachment points for mounting straps, cables, or the like in order to secure a load on trailer deck 122 and prevent it from moving while trailer 100 is moving. In some embodiments, the attachment points may be raised or counter-sunk with respect to deck top surface 105A, such as mounting brackets, flanges, hooks, rings, airline tracks, and the like. In some embodiments, the attachment points may be apertures in deck top surface 105A.

Figure 7A:
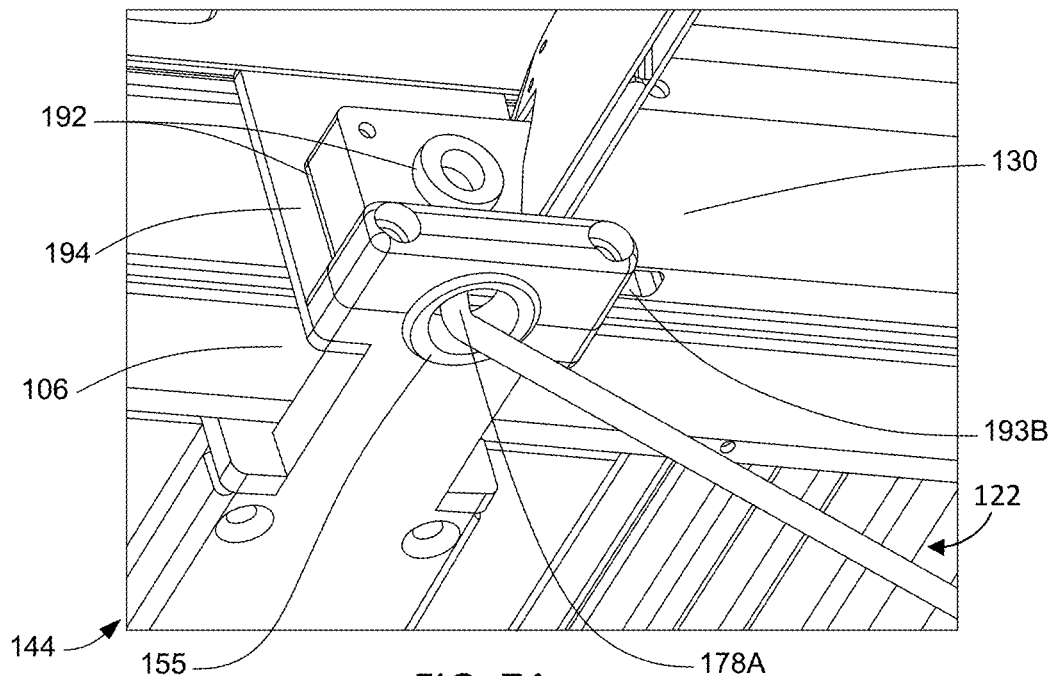
FIGS. 7A-7B depict different isometric and cutaway views of a guide ring assembly mounted on a trailer deck of a trailer in a raised position.
Figure 7B:
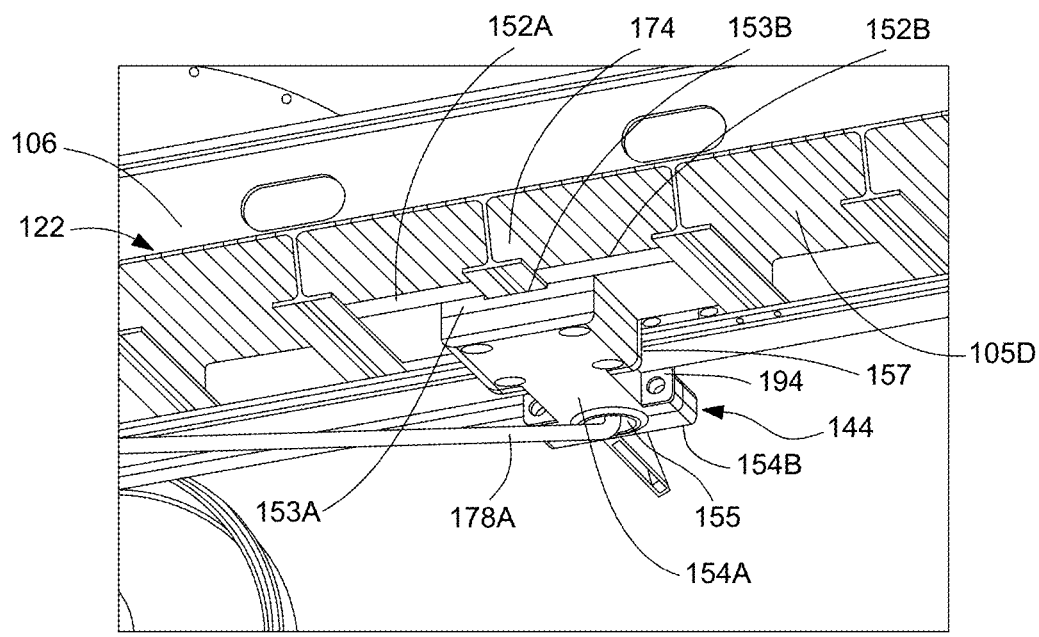

The underside of trailer deck 122 may comprise lateral or longitudinal support structures as described in FIG. 7B (e.g., trailer deck rib 174). Such support structures may provide structural integrity to trailer deck 122 and may also provide mounting locations for hardware such as a winch mount plate (e.g., 183 in FIG. 4C). In other embodiments, trailer deck 122 does not comprise support structures and is instead supported by other elements of the chassis.

The chassis of trailer 100 further comprises a plurality of rails 106, which in this embodiment include extensions that rise above the level of the trailer deck 122 and run along three sides of deck 122: the front, left, and right sides. Generally, rails 106 may extend above and below deck top surface 105A, and may be made of similar materials as trailer deck 122. In one configuration, the inner side of rails 106, e.g., the side facing the trailer load (not depicted), comprises an airline track and rail system 107, such as depicted in more detail with respect to FIG. 8B. Airline track and rail system 107 may span the length of rail 106 or may only span one or more portion(s) of it. In one embodiment, the track and rail system comprises L-track tie down rails and stud fittings. Rails 106 further comprise a plurality of apertures, which may be used as attachment points for other accessories, such as tie-down hooks and the like.

Trailer deck 122 further comprises a flared entry portion (e.g., a first flared tail 109A, a second flared tail 109B) at the loading end of the trailer. Flared tails 109A and 109B each flare outward from the long-axis centerline of trailer 100. The flared trailer deck allows an easier approach and loading of trailer 100, especially for widely set vehicles or loads.

Trailer 100 further comprises a hitch receiver mount plate 124A connected to chassis element 116. A hitch receiver 124B may be permanently or removably affixed to hitch receiver mount plate 124A. Hitch receiver 124B may be used to connect trailer 100 to a tow vehicle with a compatible tow hitch, such as a tow hitch ball or the like. Notably, other types of hitch receivers, such as couplers, rings, and others are possible. Hitch receiver 124B may be permanently or removably affixed to hitch receiver mount plate 124A, and hitch receiver mount plate 124A may be permanently or removably affixed to chassis element 116. In the depicted embodiment, hitch receiver is permanently affixed to hitch receiver mount plate 124A, and hitch receiver mount plate 124A is removably affixed to chassis element 116 by way of appropriate hardware.

Trailer further comprises wheels 128 upon which tires 110 are mounted. Wheels 128 allow trailer 100 to roll freely behind the tow vehicle. In the depicted embodiment, trailer 100 comprises a tandem (or double) axle configuration with four wheels and tires. In another embodiment, the trailer may comprise a single axle configuration with only two wheels and tires. Still other embodiments may have more axles and/or more wheels and tires per axle as compared to the depicted embodiment.

Trailer 100 further comprises a plurality of fenders 102. In some embodiments, fenders 102 are removable, such as discussed in FIG. 2E, for additional clearance on trailer deck 122 and for easier access to underlying features such as wheels 128 and tires 110. In some embodiments, fenders 102 may be a solid or hollow extruded construction.

Trailer 100 also includes an equipment enclosure 118 that is mounted between two chassis elements 116 (drawbars in this example). Equipment enclosure 118 may enclose functional and electrical aspects of trailer 100, such as those described above, and may also be used for general storage purposes. Generally, the equipment enclosure 118 may be permanently or removably affixed to chassis elements 116 by way of appropriate hardware.

Trailer 100 also includes lights (e.g., tail lights 120A, fender lights 120B, side lights 120C). The lights may be single or multi-element lights, which may indicate braking, turning, reversing, parking, and the presence of the trailer, among other things. In some embodiments, tail lights 120A and side lights 120C are recessed LED lights and fender lights 120B are LED micro-lights. Recessed lights reduce the chance of damage from loading and unloading trailer 100.

Fender lights 120B are mounted at or near the apex of fender 102 when the trailer is in a raised position so they are visible from the front and rear of trailer 120 with a single lighting element, rather than requiring lighting elements on both sides of fenders 102. In other embodiments, alternative or additional lighting elements may be used.

Trailer 100 may also include a light controller (described with respect to FIG. 12), which may interface with a vehicle directly, or which may control the operation of the trailer's lights (e.g., 120A) independently. The light controller may be stored in equipment enclosure 118 or mounted elsewhere on trailer 100.

Trailer 100 also includes a recovery winch 184, which may be used to attach to a load, such as a vehicle, and to pull the load up onto trailer deck 122. Recovery winch 184 is attached to trailer 100 as described in FIG. 4C. Recovery winch 184 can be used to move, haul, position, or lower various items. For example, recovery winch 184 may be used to load or unload a vehicle onto trailer 100.

Various winch parts or accessories can be used with recovery winch 184 and airline track and rail system 107. For example, when recovery winch 184 is attached to trailer 100 as shown, a pulley or fairlead may connect to airline track and rail system 107 at a location along the trailer that aligns with a hook point on a vehicle to be loaded onto trailer 100. Though not shown, in some embodiments, recovery winch 184 may be powered by a battery in the equipment enclosure 118 or a separate power source (such as leads from an automobile battery) and may be controlled by a wired or wireless remote control, or by switches on recovery winch 184. In other embodiments, recovery winch 184 may be connected to an alternative power supply, such as the power system of the tow vehicle through an electrical connection to the tow vehicle (as in standard electrical tow outlets).

Trailer 100 also includes a license-plate mount 111 which holds a license plate for trailer 100. License-plate mount 111 is attached to the trailer chassis. In this embodiment, license-plate mount 111 is movable between multiple positions such that when loading or unloading trailer 100, license-plate mount 111 may be positioned out of the approach path for trailer deck 122. Once trailer 100 is loaded, license-plate mount 111 can be moved into the position shown for compliance with legal requirements for license-plate orientation.

Trailer 100 may also include a satellite-based location system (e.g., GPS or GLONASS) (not depicted), for example powered by battery, which provides a periodic location of the trailer for tracking and theft prevention purposes. The satellite-based location device may be stored in equipment enclosure 118 or mounted elsewhere on trailer 100.

FIG. 1B shows a view of trailer 100 from a side view. Many of the same features described with respect to FIG. 1A are also visible in FIG. 1B.

FIGS. 1C and 1D depict trailer 100 in a lowered position and otherwise depict generally the same features described with respect to FIG. 1A.

Figure 2A:
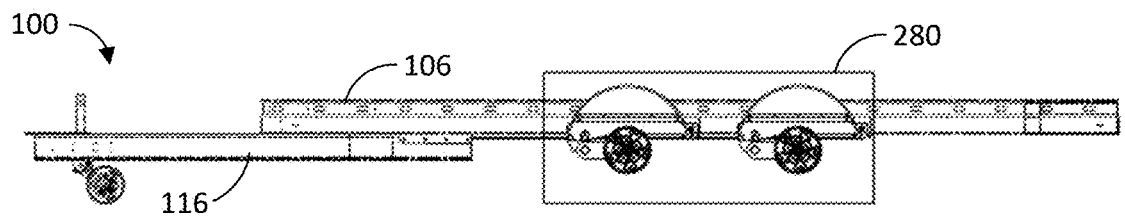
FIGS. 2A-2C depict different plan and isometric views of a trailer in a raised position with wheels removed.
Figure 2B:
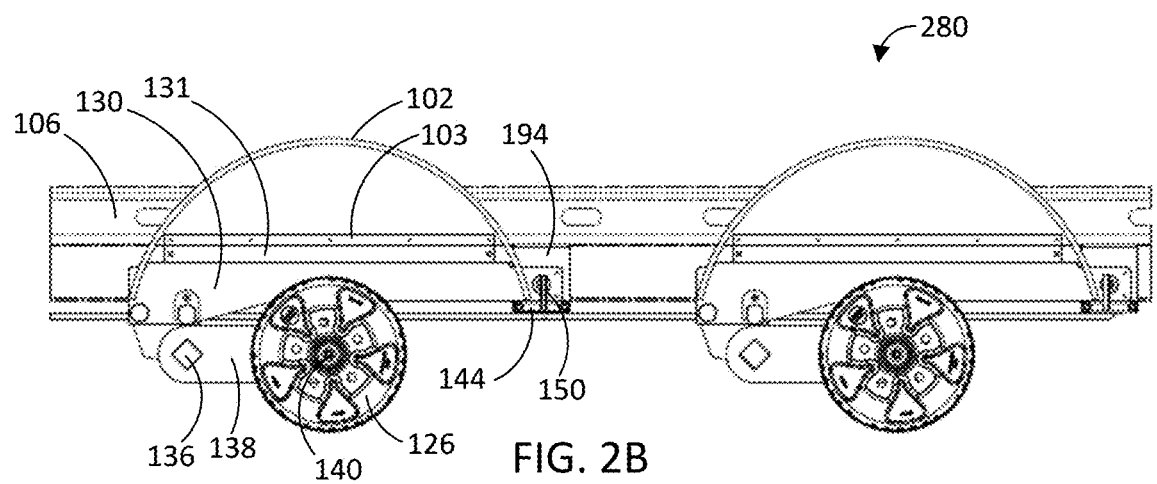
Figure 2C:
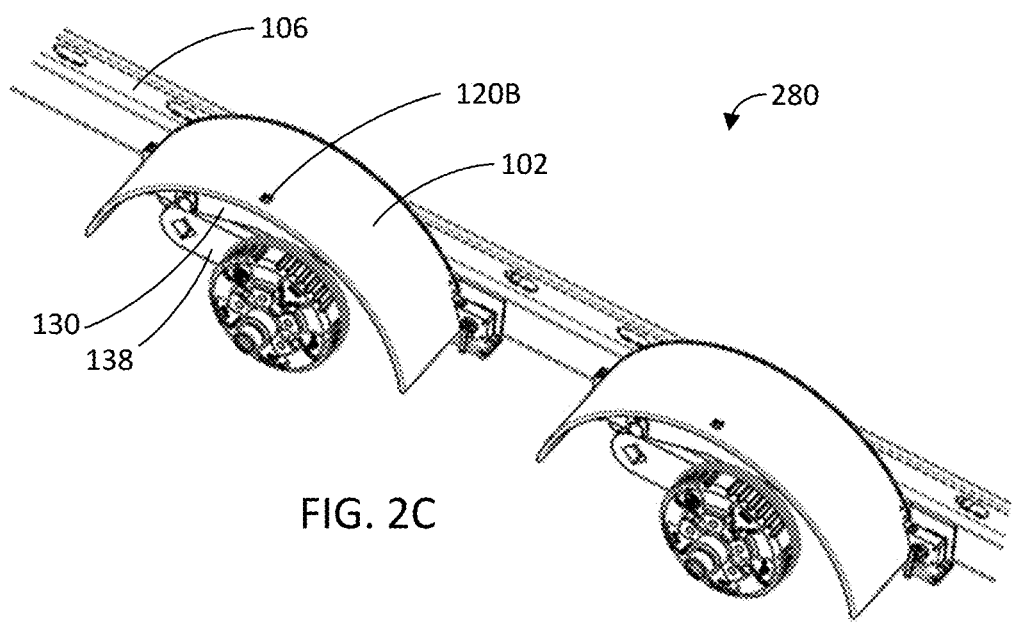

FIGS. 2A-2C depict plan and isometric views of a trailer 100 in a raised position with wheels removed to reveal other features of trailer 100. Many of the same features described with respect to FIGS. 1A-1D are also visible in FIGS. 2A and 2B as well as additional details.

In particular, FIG. 2A depicts a side view of trailer 100. Area 280 outlines components of a positioning subassembly for trailer 100.

FIG. 2B depicts components of the positioning subassembly as denoted by area 280 of FIG. 2A. Generally, each wheel of trailer 100 may be connected to a positioning subassembly comprising a positioning arm 130 and a suspension arm (or torsion arm) 138. Positioning arms 130 are attached to positioning cables, which cause positioning arms 130 to raise or lower, and thereby raise or lower the chassis of trailer 100. Suspension arms 138 are attached to wheel hubs through an outboard stub axle 140, and ultimately to wheels and tires and act as a suspension component that can rotate around the axis of a torsion axle tube 136. The movement of suspension arms 138 is moderated by the torsion axle system, which is described in more detail below with respect to FIG. 6A.

Suspension arm 138 and positioning arm 130 are substantially horizontal to the ground (not shown) while trailer 100 is in a raised position. In this embodiment, the horizontal position of suspension arm 138 provides the greatest ground clearance while moving trailer 100, such as when towing trailer 100 behind a vehicle. In other embodiments, the arrangement of suspension arm 138 and positioning arm 130 may be different.

Trailer 100 also comprises a brake system. The brake system includes brakes 126 which are attached to outboard stub axles 140. Brakes 126 may be, for example, a drum-type brake (as depicted) or a disc-type brake (in other embodiments), and may be used to apply braking force to an attached wheel and tire combination so as to reduce the speed of a trailer. Wheel studs (not depicted) may be used to attach a wheel and tire combination to brakes 126.

Trailer 100 may also include a brake controller (not depicted), which may interface with a tow vehicle directly, or which may control the operation of the brakes via some other logic. The brake controller may be stored in an equipment enclosure (e.g., 118 in FIG. 1A) or mounted elsewhere on trailer 100.

The chassis (e.g., chassis element 116 in FIG. 2A and rails 106) extends underneath and down the length of the trailer deck (e.g., 122 in FIG. 1A) in this embodiment. In particular, in the depicted embodiment, the drawbars of the chassis end before outboard stub axles 140 and suspension arms 138. In other embodiments, various chassis elements (e.g., drawbars or rails) may extend further down the length of the trailer deck and may extend past outboard stub axles 140 and suspension arms 138. In some embodiments, elements of chassis are integral to and form a part of the structure for the trailer deck and vice versa.

Figure 9A:
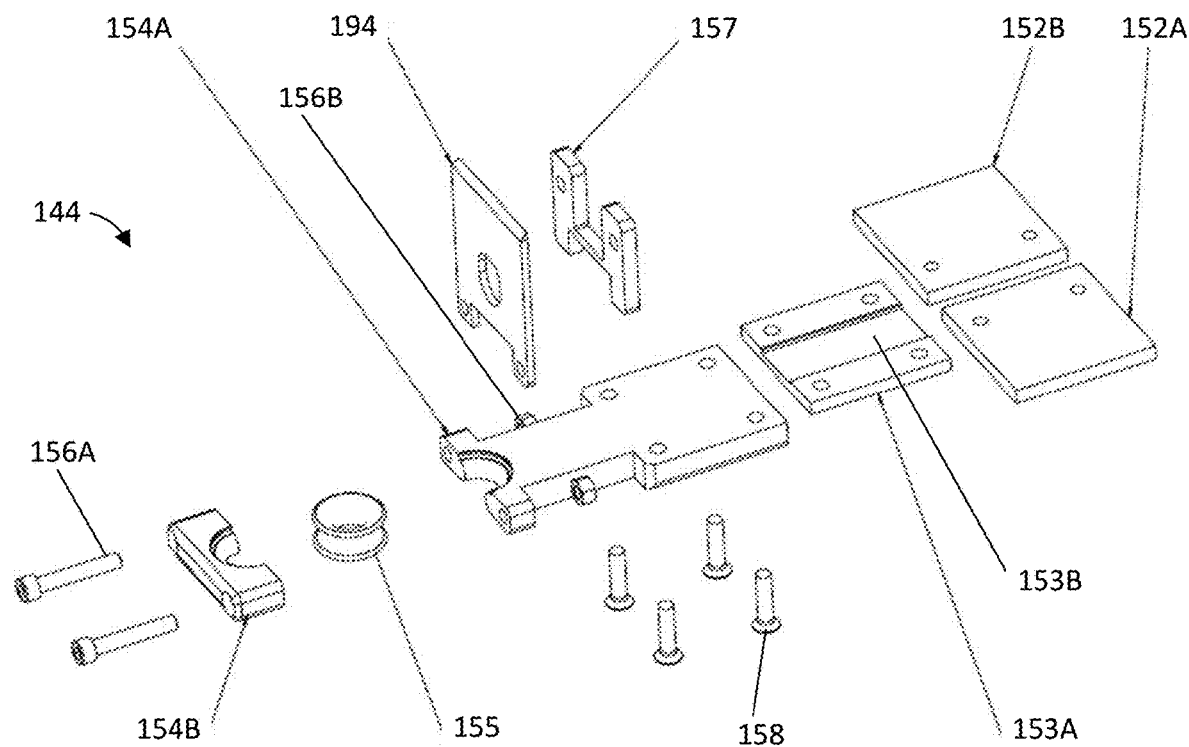
FIGS. 9A-9B depict different isometric views of a guide ring assembly.
Figure 9B:
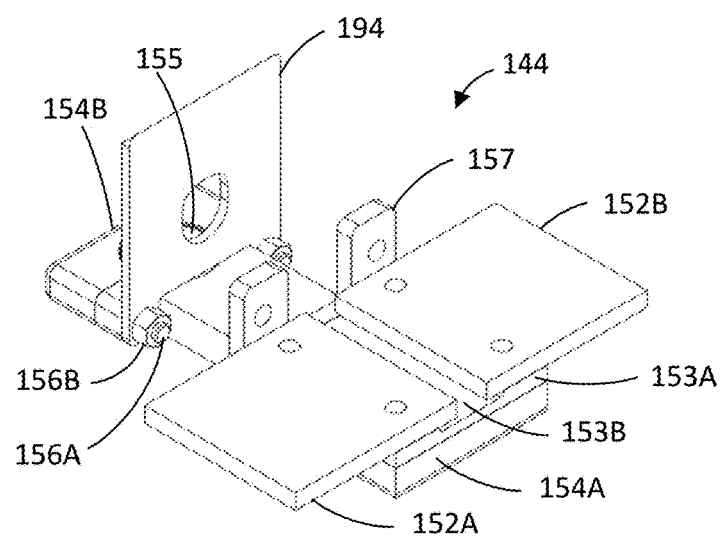

When trailer 100 is in a raised position as depicted, a locking mechanism 150 secures positioning arm 130 to a latch guide plate 194, which is part of a glide ring mount assembly 144 (described further with respect to FIGS. 9A-9B). Locking mechanism 150 is a safety feature which prevents movement of positioning arm 130 during regular operation of a trailer, such as when the trailer is being moved or towed behind a vehicle. Locking mechanism 150 may be unlocked when lowering the trailer from a raised position.

In some embodiments, locking mechanism 150 is a plunger-type lock that engages with an aperture in latch guide plate 194 (e.g., a latch guide plate aperture 195 in FIG. 2E), which is complementary locking structure. In one example of this embodiment, locking mechanism 150 is manually operated by a user and comprises a handle or tab allowing the user to rotate locking mechanism 150 and secure positioning arm 130 to latch guide plate 194. Locking mechanism 150 can be configured such that its handle or tab are roughly perpendicular to the ground when secured and parallel to the ground when unsecured, although other configurations may be used. In another embodiment, locking mechanism 150 may comprise a lever-like handle or tab allowing a user to flip closed the handle or tab to secure positioning arm 130.

In some embodiments, locking mechanism 150 may be biased towards the locked position (e.g., by a spring) so that when the locking element comes into alignment with the aperture in the locking plate, it automatically deploys into the aperture. In other embodiments, locking mechanism 150 may be remotely or automatically operable, such as by use of an electronic solenoid, electromagnetic latch, pneumatics, or other activation means.

Positioning arm 130 further comprises a positioning arm mount strip 131 and fender 102 further comprises a fender mount strip 103. Fender mount strip 103 attaches to positioning arm mount strip 131, securing fender 102 to positioning arm 130. In other embodiments, such as described in FIG. 2E, fender 102 may be connected by a quick release mechanism.

FIG. 2C depicts an isometric view of FIG. 2B showing generally the same features as described above.

Figure 2D:
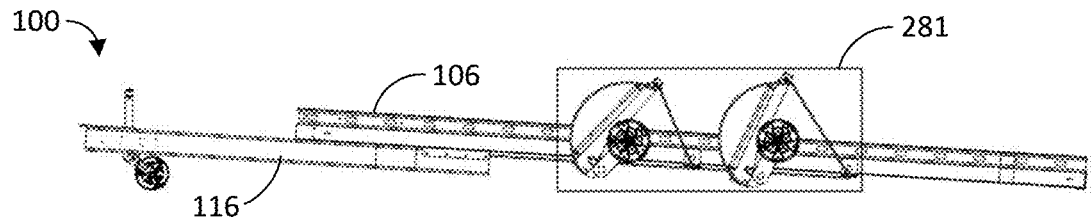
FIGS. 2D-2F depict different plan and isometric views of a trailer in a lowered position with wheels removed.
Figure 2E:
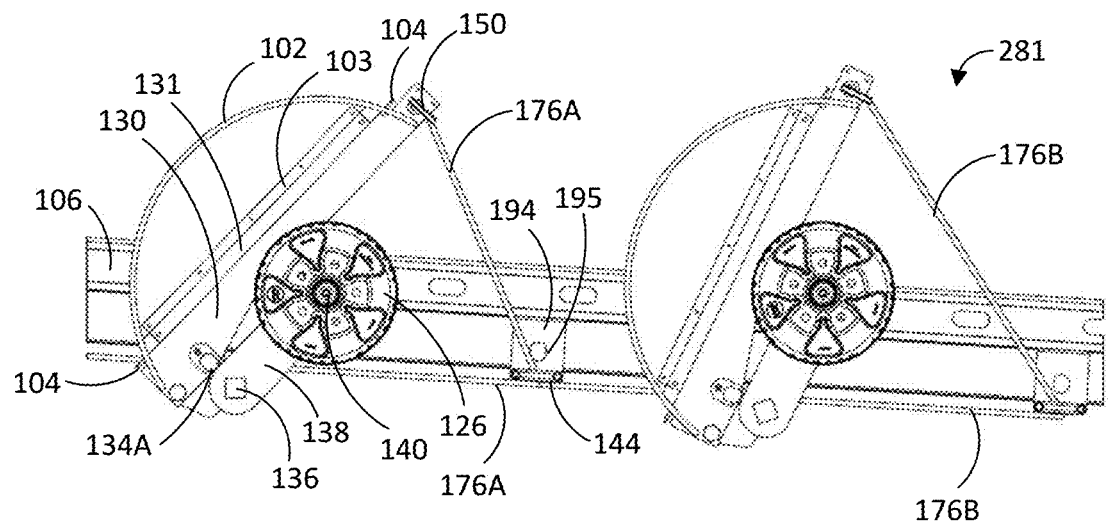
Figure 2F:
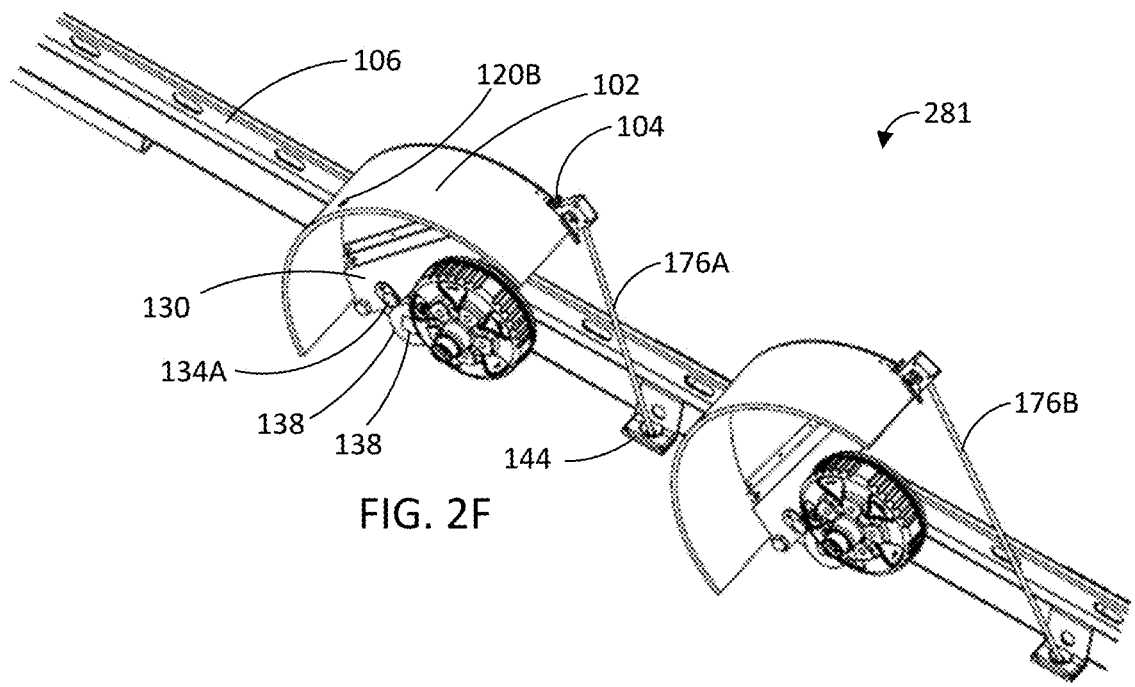

FIGS. 2D-2F depict trailer 100 in a lowered position. In particular, FIG. 2D depicts a side view of trailer 100. Area 281 outlines components of the positioning subassembly for trailer 100 when in the lowered position, which are further described with respect to FIGS. 2E and 2F.

FIG. 2E depicts components of the positioning subassembly as denoted by area 281 of FIG. 2D. In particular, FIG. 2E depicts positioning arms 130 and fenders 102 in a more upright position due to the lowered position of trailer 100. Notably, positioning arms 130 are outboard of rail 106 in order that they may rotate up and down as trailer 100 is raised and lowered. The position of fender 102 while trailer 100 is in a lowered position provides an advantageously unrestricted view of tires so that, for example, they may be inspected for tread wear, punctures, or other conditions. Further, positioning arms 130 are located along the length of the trailer chassis, but do not extend in front of or behind the length of the trailer chassis no matter the orientation of the trailer chassis (i.e., whether or not it is raised or lowered). Locking mechanism 150 is unlocked and a latch guide plate aperture 195 is visible.

When trailer 100 is lowered, positioning arms 130 rotate around axle pivot bolts 134A under control of positioning cables (e.g., a first positioning cable 176A, a third positioning cable 176B), which travel through respective guide rings in guide ring assembly 144. Additional details on the lowering process of trailer 100 are discussed with respect to FIG. 4A.

In the depicted embodiment, fenders 102 attach to positioning arm 130 by a quick-release mechanism, which attaches to positioning arm 103 through a plurality of fender quick-disconnect connections (e.g., 104). The quick-release mechanism may be a push button such as a hood pin or bumper pin, ball-lock pin, spring-loaded shackle, or handle with a threaded stud. Removing fender 102 provides additional access to loads on the trailer deck which may, for example, allow a vehicle to open its doors when the vehicle is on trailer 100. As another benefit, a removable fender allows easier inspection and servicing of wheels and tires.

FIG. 2F depicts an isometric view of the aspects described with respect to FIG. 2E.

Figure 3A:
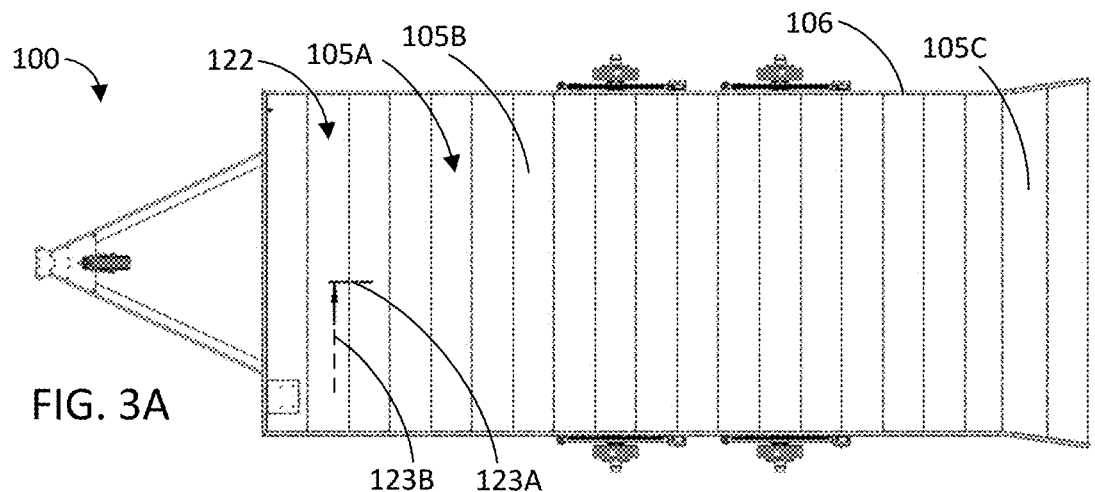
FIGS. 3A-3B depict different plan and cross-sectional views of a trailer in a raised position.
Figure 3B:
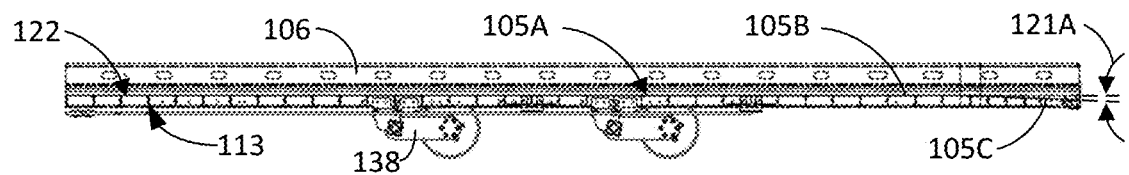

FIGS. 3A and 3B depict different plan and cross-sectional views of trailer 100 in a raised position. The embodiments in FIGS. 3A and 3B are depicted without wheels or tires.

In particular, FIG. 3A depicts an overhead view of trailer 100 with cutaway line 123A used to define the cross-sectional view in FIG. 3B.

FIG. 3B depicts a cross-sectional view of a portion of trailer 100 from FIG. 3A. The cross-sectional view is created along cutaway line 123A in FIG. 3A and in the direction of arrow 123B in FIG. 3A.

Level deck 105B and angle deck 105C are clearly depicted from this perspective. A deck angle referenced to level deck 121A is the angle of angle deck 105C with reference to trailer deck portion 105B (as compared to with reference to the ground level in FIG. 3D). Angle 121A may be alternatively referred to as the trailer deck angled portion declination angle. In various embodiments, angle 121A may be equal to or less than 5 degrees, 4 degrees, 3 degrees, 2 degrees, and so on.

Deck portions 105B and 105C are distinguished by an intersection where the angle of one portion changes to the angle of the other portion without significant transition. However, in other embodiments, the transition from one trailer deck portion to another may be gradual, such as a curved or stepped transition over a set length or radius of curvature. In the embodiment depicted in FIGS. 3A and 3B, trailer deck portion 105C is shorter in length than trailer deck portion 105B, as measured down raised trailer length cutaway line 123A.

FIG. 3B further depicts deck support structures 113, which may be integrally formed by a deck surface extrusion.

Figure 3C:
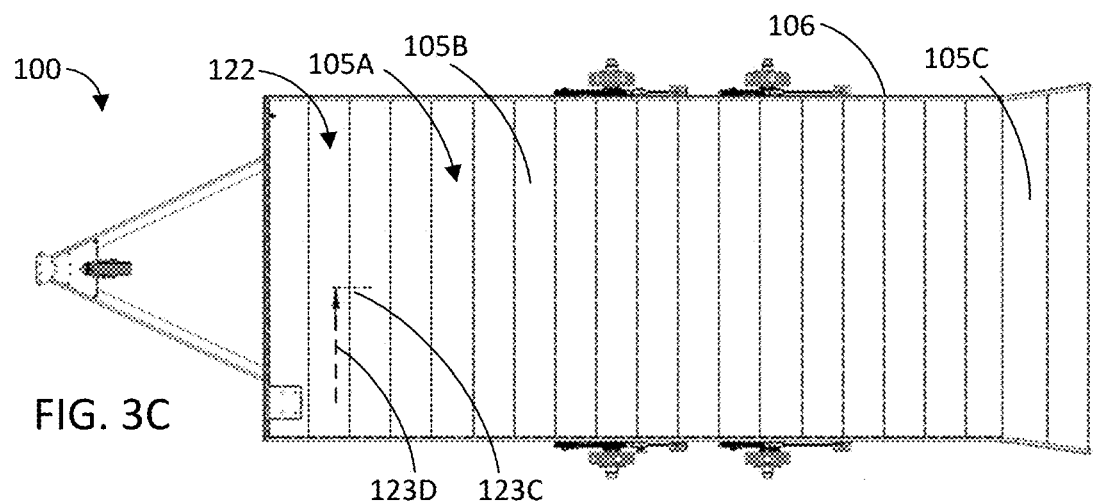
FIGS. 3C-3D depict different plan and cross-sectional views of a trailer in a lowered position.
Figure 3D:
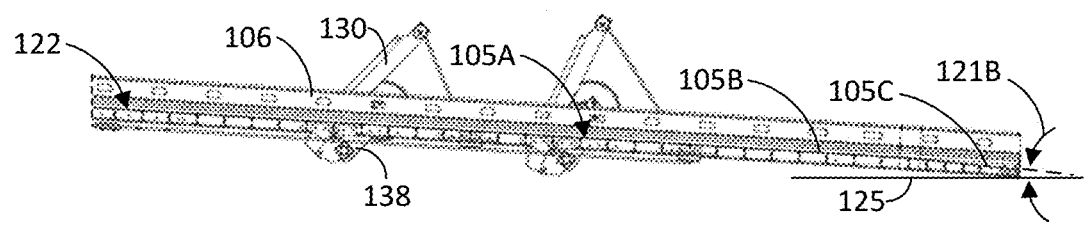

FIGS. 3C and 3D depict different plan and cross-sectional views of a trailer 100 in a lowered position. FIG. 3C further depicts a lowered trailer length cutaway line 123C. Cutaway line 123C is used to create the cross-sectional view in FIG. 3D. The embodiments in FIGS. 3C and 3D are otherwise similar to FIGS. 3A and 3B, respectively.

FIG. 3D depicts a ground level 125 and an approach angle referenced to ground 121B (i.e., the angle formed between angle deck 105C and ground level 125). Angle 121B is advantageous for a load being moved up trailer deck 122 from ground level 125. For example, in some embodiments, approach angle 121B (which may alternatively be referred to as the trailer deck angled portion ground inclination angle) may be equal to or less than 5 degrees, 4 degrees, 3 degrees, 2 degrees and so on. The low approach of angle 121B allows for trailer 100 to accommodate loads with relatively low ground clearances and/or very shallow available approach angles, such as vehicles that sit low to the ground and/or have elements protruding from their loading ends that further reduce available approach angles. In this way, trailer deck portion 105C acts as an integrated ramp for trailer 100, without the need to deploy additional, standalone ramps.

While not shown in FIG. 3D, trailer 100 may include bumpers or the like underneath trailer deck portion 105C in order to avoid damaging trailer deck portion 105C (or any other portion of trailer 100) when trailer 100 to the ground level. The bumpers may be any sort of impact and/or abrasion resistant material, such as DELRIN®, and may be removable and replaceable to allow for long-term use of trailer 100.

Examples of Dynamic Systems for a Trailer with Positioning Features

FIGS. 4A-4C depict different isometric views of trailer 100 in a lowered position without the trailer deck (e.g., 122 in FIG. 1A), wheels, or tires in order to better depict operation of the positioning system.

In particular, FIG. 4A depicts an isometric view from under trailer 100. Area 480 outlines components of a sub-assembly for the trailer positioning system. Generally, the positioning system includes a winch 182 (or positioning winch), which is connected by a control cable 170 (or winch cable) to one or more positioning cables (e.g., a first positioning cable 176A, a second positioning cable 178A, a third positioning cable 176B, and a fourth positioning cable 178B) via a cable connection assembly 172. The positioning cables are connected to positioning arms through guide rings (e.g., 130 and 155, respectively, in FIG. 4B).

The positioning system operates to lower the trailer deck by letting out control cable 170 in the direction of arrow 197 so that the positioning cables and cable connection assembly 172 move towards the loading end of the trailer and towards the positioning arms (e.g., 130 in FIG. 4B), which causes the positioning arms and suspension arms (e.g., 138 in FIG. 4B) to rotate upward through an arc. This change in position of the positioning and suspension arms causes the trailer chassis to lower, and in particular, allows the loading end of the trailer to lower to the ground.

Conversely, the positioning system operates to raise the trailer chassis by bringing in control cable 170 in the direction of arrow 196 so that the positioning cables and cable connection assembly 172 move towards the non-loading end of the trailer, which causes the positioning and suspension arms to rotate downward through an arc. This change in position of the positioning and suspension arms causes the trailer chassis to raise, e.g., from the ground to a level position.

Trailer 100 includes a plurality of positioning cables. Generally, positioning cables may attach at a first end to a positioning arm and at a second end to either cable connection assembly 172 or to another positioning arm by way of cable connection assembly 172. In the depicted embodiment, positioning cables 176A and 176B (which in some embodiments are one contiguous cable) attach to the positioning arms on a first side of trailer 100, and similarly positioning cables 178A and 178B connect to positioning arms on the other side of trailer 100. Beneficially, when single cable is used on each side (e.g., a cable attached to two positioning arms by way of cable connection assembly 172, then the positioning cables will tend to maintain tension even when the surface under independent tires connected to independent positioning arms varies (e.g., is not level).

Notably, in this embodiment, positioning cables 176 and 178 are routed above axle tubes 166 in order to provide improved ground clearance and to protect the cables from damage.

In some embodiments, control cable 170 is attached to winch 182 at one end, runs through cable connection assembly 172, and then back towards winch 182 to a cable termination point forming a control cable loop (or winch cable loop). In this embodiment, the cable termination point in on control cable 170. In other embodiments, the winch cable termination point may be on winch 182, at cable connection assembly 172, part of trailer deck (e.g., 122 in FIG. 1A), on the chassis (e.g., rail 106, chassis element 116), or at any other suitable spot.

Control cable 170 and positioning cables 176 and 178 may be made of a strong and durable material, such as those described above. In some embodiments, positioning cables are made of a synthetic material, included woven or braided synthetic materials, which beneficially provides strength, resistance to wear, and protection from environmental harm.

In some embodiments, cable connection assembly 172 may comprise one or more pulleys, such that cables (e.g., 170, 176, and 178) may smoothly wrap around the pulleys and be actuated. In other embodiments, cable connection assembly 172 may comprise one or more non-moving cable guide elements such as a guide ring, guide post, thimble, loop, hook, fairlead, cleat, clevis, or shackle. In another embodiment, cable connection assembly 172 may comprise one or more termination points instead of pulleys or non-moving guide elements. For example, a winch cable 170 may be terminated around a post or similar connection point in cable connection assembly 172. Alternatively, when a winch cable loop is formed, a pulley may allow for smoother operation of the winch cable when raising or lowering a trailer chassis.

Winch 182 may be mounted in a variety of ways. In some embodiments, winch 182 is mounted to the underside of the trailer deck and oriented such that winch cable 170 enters the winch's spool approximately parallel to the trailer deck. This configuration allows winch cable 170 and positioning cables 176 to stay close to the underside of the trailer deck, which beneficially improves the ground clearance of winch cable 170 and positioning cables 176 and prevents entanglement, damage, and wear from debris when towing the trailer. In some embodiments, winch 182 is surrounded by an enclosure that beneficially protects it from damage and exposure to the environment. As above, winch 182 is one example of a device for actuating control cable 170 and positioning cables 176 and 178, but in other embodiments, other types of actuators may be used.

Though not shown, winch 182 may be powered by a battery or by a towing vehicle's power system. In one embodiment, the battery is housed in the equipment enclosure of trailer 100 (not shown).

FIG. 4B depicts components of the positioning subassembly as denoted by area 480 of FIG. 4A. In particular, FIG. 4B clearly shows how guide rings 155 attach to the trailer chassis via a guide ring assembly 144, which is described in more detail with respect to FIGS. 7-9B.

FIG. 4C depicts an isometric view from above trailer 100. A side rail (e.g., 106) from the right side of trailer 100 is omitted to provide a better view of certain components of the positioning subassembly, such as guide ring assemblies 144.

Further in this embodiment, winch 182 is mounted to a winch mount plate 183 which is attached to a side rail 106. In other embodiments, winch mount plate 183 may be attached to other locations of the chassis (e.g., chassis element 116) or to the trailer deck.

In the depicted embodiment, a recovery winch mount plate 185 is used to mount a recovery winch (e.g., 184 in FIG. 1A) and may be removable. Recovery winch mount plate 185 may attach to rail 106 or other locations of the chassis or to the trailer deck. In another embodiment, recovery winch mount plate 185 attaches to airline track and rail system 107, which beneficially allows easy removal of recovery winch mount plate 185 and recovery winch 184. In another embodiment, recovery winch 184 may be attached without recovery winch mount plate 185.

FIGS. 4D-4F depict different isometric views of trailer 100 in a raised position without the trailer deck, and are otherwise similar to FIGS. 4A-4C.

Figure 5:
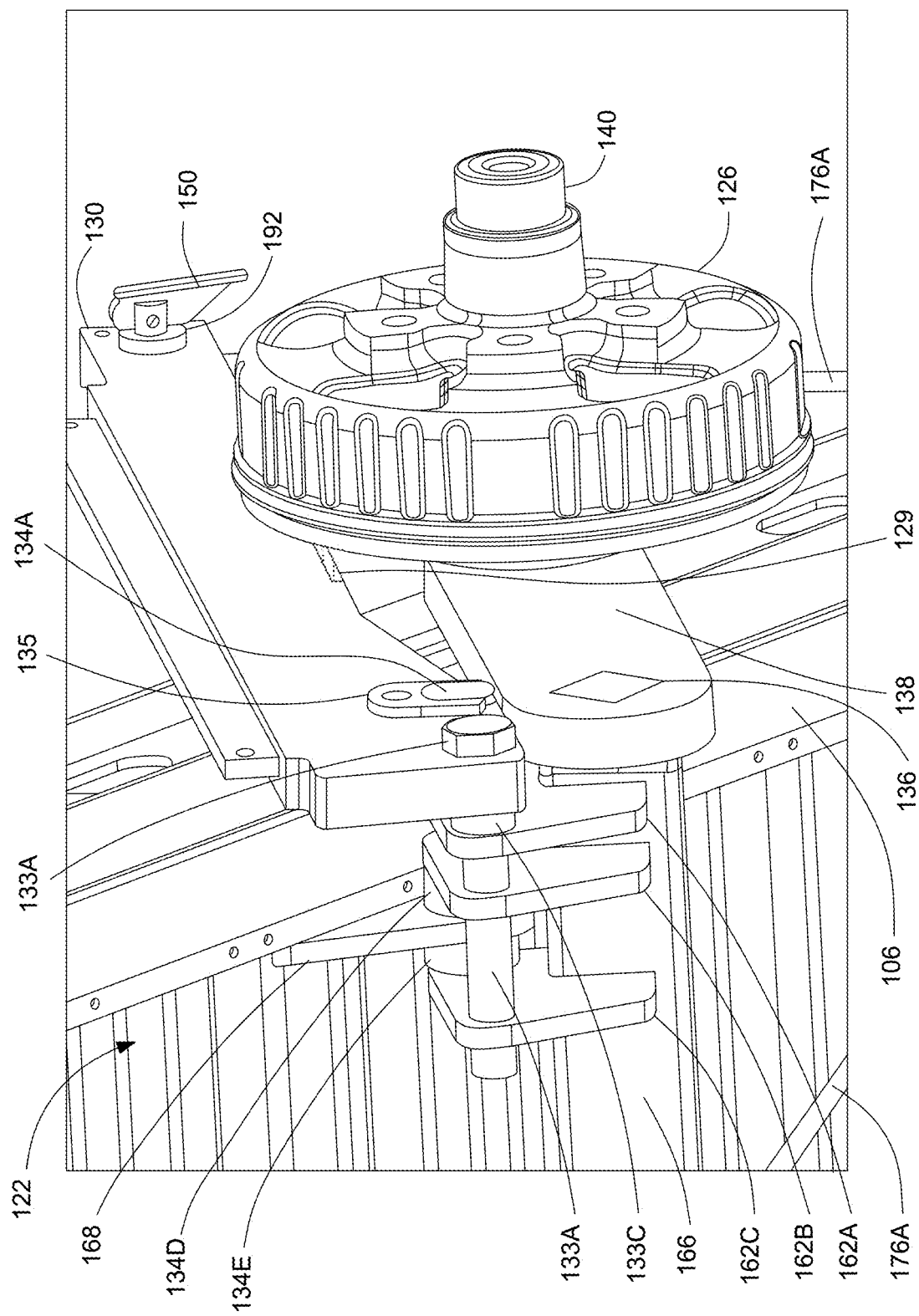
FIG. 5 depicts an isometric view of aspects of a positioning arm connected to an axle tube and trailer chassis.

Examples of Positioning Mechanisms and Suspensions for Trailer with Positioning Features FIG. 5 depicts an isometric view of aspects of positioning arm 130 and suspension arm 138 when the trailer is in a lowered position. Here again, wheels and tires are omitted for clarity.

A plurality of axle mount plates 162 (e.g., a first axle mount plate 162A, a second axle mount plate 162B, a third axle mount plate 162C) attach to axle tube 166 and connect axle tube 166 to positioning arm 130 through an axle mount bolt 133A. An axle mount packer 133C is located on the shaft of axle mount bolt 133A and is positioned between positioning arm 130 and first axle mount plate 162A. Axle mount bolt 133A may use additional hardware in assembly such as depicted in FIG. 6B (e.g., 133B).

Axle mount plates 162 are further connected to chassis mount plate 168 via axle mount bolt 134A, and chassis mount plate 168 is connected to a side rail 106.

In some embodiments, axle mount plates 162 are welded to axle tube 166. In other embodiments, the axle mount plates are integrally formed with a collar that is fitted annular, or at least partly annular, to the axle mount tube, as discussed with respect to FIG. 6C. In some embodiments, the positioning arm is connected directly to the torsion axle tube such that no axle mount plates are required.

Positioning arms 130 are configured to rotate around the axis formed by pivot bolt 134A in the depicted embodiment. A first axle pivot bearing 134D is located on the shaft of axle pivot bolt 134A and is positioned between second axle mount plate 162B and chassis mount plate 168 in this embodiments. A second axle pivot bearing 134E is located on the shaft of axle pivot bolt 134A and is positioned between third axle mount plate 162C and chassis mount plate 168.

As the trailer is raised or lowered, positioning arm 130, axle tube 166, and suspension arm 138 rotate about the lengthwise axis of axle pivot bolt 134A. Axle pivot bearings 134D and 134E allow the assembly to rotate about the trailer chassis. A pivot bolt retaining plate 135 prevents axle pivot bolt 134A from rotating independently of positioning arm 130.

In some embodiments, the axle tube and the suspension arm axially rotate around a bearing interposed between the axle tube and suspension arm. For example, a bearing journal may be formed in the suspension arm and adapted for engagement with an outer bearing surface, and the axle tube is adapted for engagement with the inner bearing surface. In such an example, the bearing replaces the axle pivot bolt and the suspension arm rotates independently of the axle tube, which rotates with the rest of the trailer.

Figure 6A:
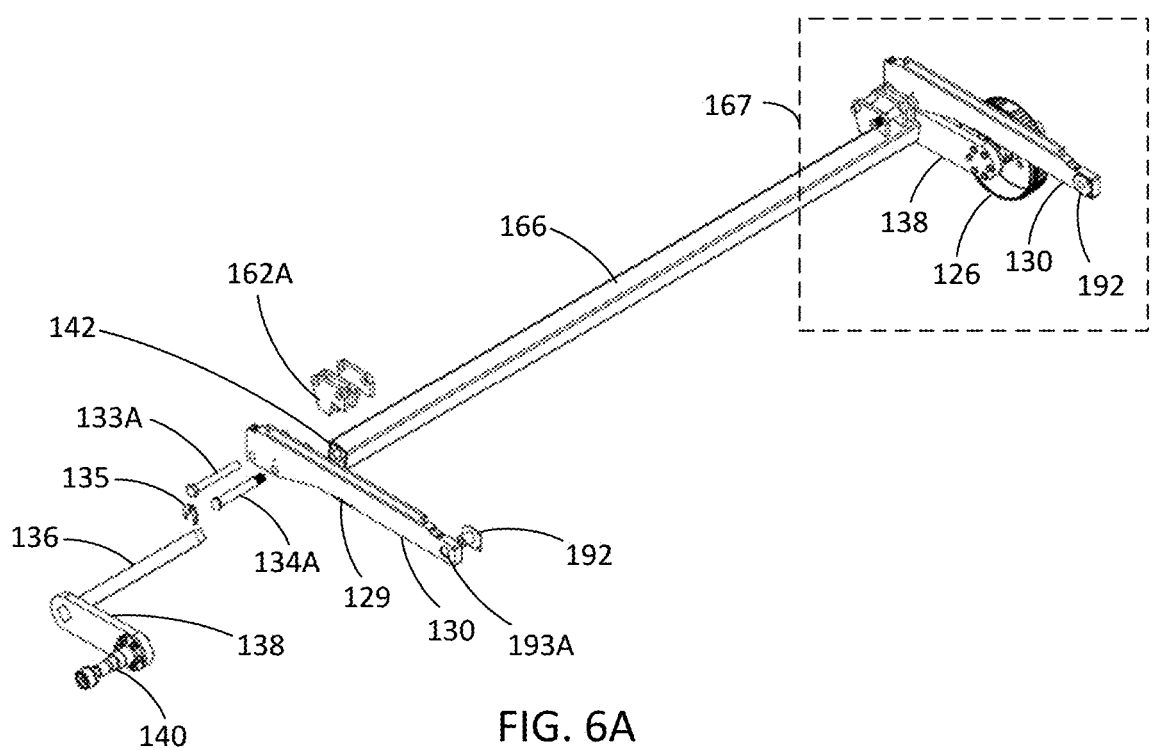
FIGS. 6A-6B depict different exploded isometric views of a positioning arm assembly and an axle tube.
Figure 6B:
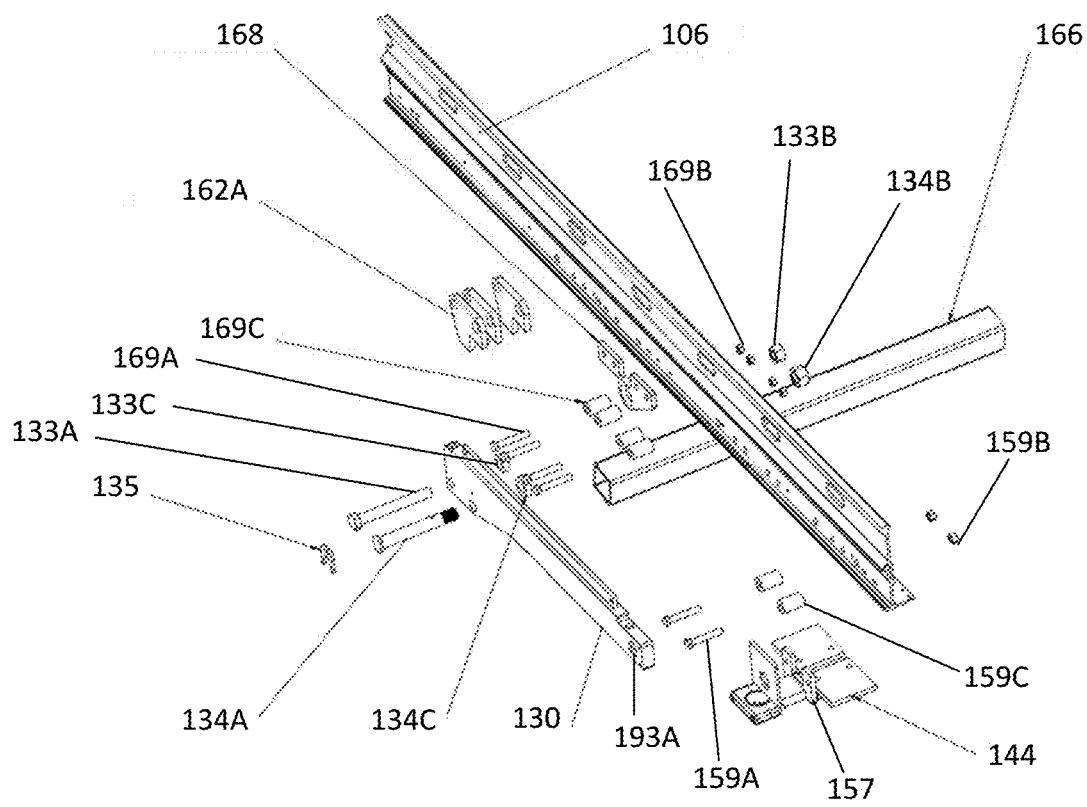

Suspension arm 138 connects to axle tube 166 through torsion axle tube 136 as further described with respect to FIG. 6A.

Notably, FIG. 5 depicts one example embodiment, but in other embodiments various numbers of axle plates (e.g., 162A), bearings (e.g., 134D), and other hardware may be used.

In the depicted embodiment, positioning arm 130 comprises a rubber bump stop 129 made of a flexible or elastomeric material. Rubber bump stop 129 offers additional protection to positioning arm 130 from movement of suspension arm 138 and may function as part of the trailer's overall suspension system.

FIG. 5 further depicts locking mechanism 150 (e.g., a latch barrel) attached to positioning arm 130 as described in FIG. 6A.

FIGS. 6A and 6B depict different exploded isometric views of a positioning arm assembly 167 and axle tube 166. In the depicted embodiment, positioning arm assembly 167 comprises a positioning arm 130, suspension arm 138, and axle mount plates 162, stub axle 140, and torsion axle tube 136 as well as connecting hardware.

Torsion axle tube 136 is the functional axle for allowing suspension arm 138 to rotate relative to an axle tube 166. Torsion axle tube 136 is located on the side of suspension arm 138 toward the front, non-loading end of the trailer. In one embodiment, torsion axle tube 136 is made of hardened steel and has a generally square cross-section. In other embodiments, it may be made of other materials and may have different cross-sectional shapes, such as other polygonal shapes.

Suspension arm 138 connects to torsion axle tube 136, which is then positioned within axle tube 166 so as to interface with rubber cords within axle tube 166. In one embodiment, the lengthwise axis of torsion axle tube 136 is collinear with the lengthwise axis of axle tube 166, but other configurations may be used. In some embodiments, torsion axle tube 136 is pressed into an aperture in suspension arm 138 and then welded into place. In other embodiments, hardware may be used to attach torsion axle tube 136 to suspension arm 138. In yet other embodiments, axle tube 136 and suspension arm 138 may be integrally formed as one piece.

In some embodiments, each axle tube 166 contains four rubber cords 142 along each inside corner, although more or less may be used in other embodiments. In this embodiment, torsion axle tube 136 is offset from axle tube by approximately 45 degrees such that a cross section of the assembly would appear as a diamond inside a square, although other embodiments may use different configurations. Rubber cords 142 fill the gaps between torsion axle tube 136 and the inner walls of axle tube 166 forming a torsion axle, which beneficially eliminates the need for leaf springs and improves ride quality. The torsion axle configuration further beneficially allows for more ground clearance and allows axle tubes 166 to be placed relatively further back along the length of the trailer, which improves the trailer's handling.

Rubber cords 142 may be made of any flexible or elastomeric material. In other embodiments, rubber cords 142 may not be used and instead the space inside axle tube 166 and around torsion axle tube 136 may be filled with the rubber cord material. In one embodiment, torsion axle tube 136 is pressed into rubber torsion cords 142 of axle tube 166 using an emulsion grease. The emulsion grease beneficially dissipates after installation and thus prevents slippage of torsion axle tube 136, securing suspension arm 138 to axle tube 166. In some embodiments, the suspension arm is preloaded around 15 degrees to accommodate the weight of the trailer.

Wheels (not depicted) and brake drums 126 connect to suspension arms 138 through outboard stub axle 140, which is the axle about which the wheels rotate. In this embodiment, outboard stub axle 140 is located on the side of suspension arm 138 toward the rear, loading end of the trailer. Outboard stub axle 140 may be permanently attached to suspension arm 138 or removably attached via bolts or other appropriate hardware.

Positioning arm 130 connects to axle tube 166 as previously described. Positioning arm 130 comprises a latch barrel 192 which attaches to positioning arm 130 through a latch barrel cutout (or aperture) 193A. A first end of a positioning cable (e.g., 176A) attaches to latch barrel 192 as further described in FIG. 7A. Generally, the latch barrel is a cylindrical element around which the positioning cable can be connected and inside of which a locking mechanism can be positioned.

FIG. 6B is a similar view to FIG. 6A with additional components depicted.

In particular, FIG. 6B shows how positioning arm 130 and axle tube 166 connect to a side rail 106. As above, an axle mount packer 134C is located on the shaft of axle mount bolt 134A and is positioned between positioning arm 130 and first axle mount plate 162A. An axle pivot packer 134C is similarly oriented on axle pivot bolt 134A. Packers 133C and 134C ensure positioning arm 130 is properly spaced from deck frame 106 and permit a snug fit when assembled. An axle mount nut 133B secures everything to axle mount bolt 133A and an axle pivot nut 134B secures everything to axle pivot bolt 134A.

Chassis mount plate 168 connects to rail 106 of the trailer chassis using a plurality of chassis mount bolts 169A. A chassis mount packer 169C is located on the shaft of chassis mount bolt 169A and is positioned between rail 106 and chassis mount plate 168. A chassis mount nut 169B secures everything to chassis mount bolt 169A.

As previously discussed, axle pivot bolt 134A is the rotation point for the positioning assembly 167. When the trailer changes position from a raised position to a lowered position, positioning arm 130 and axle tube 166 rotate as one. In another embodiment, axle tube 166 may be disposed within a bearing assembly connected, for example, to an element of the chassis.

FIG. 6B further depicts guide ring assembly 144 which comprises mount plate 157. Mount bolts 159A attach mount plate 157 to rail 106 of the chassis. A mount packer 159C is located on the shaft of mount bolts 159A and is positioned between mount plate 157 and rail 106. Mount packers 159C ensure mount plate 168 is properly spaced from rail 106 and permit a snug fit when assembled. A mount nut 159B secures everything to mount bolt 159A.

Other embodiments may use different configurations including more or fewer plates (e.g., 162), bolts (e.g., 169A), or other mounting hardware.

Figure 6C:
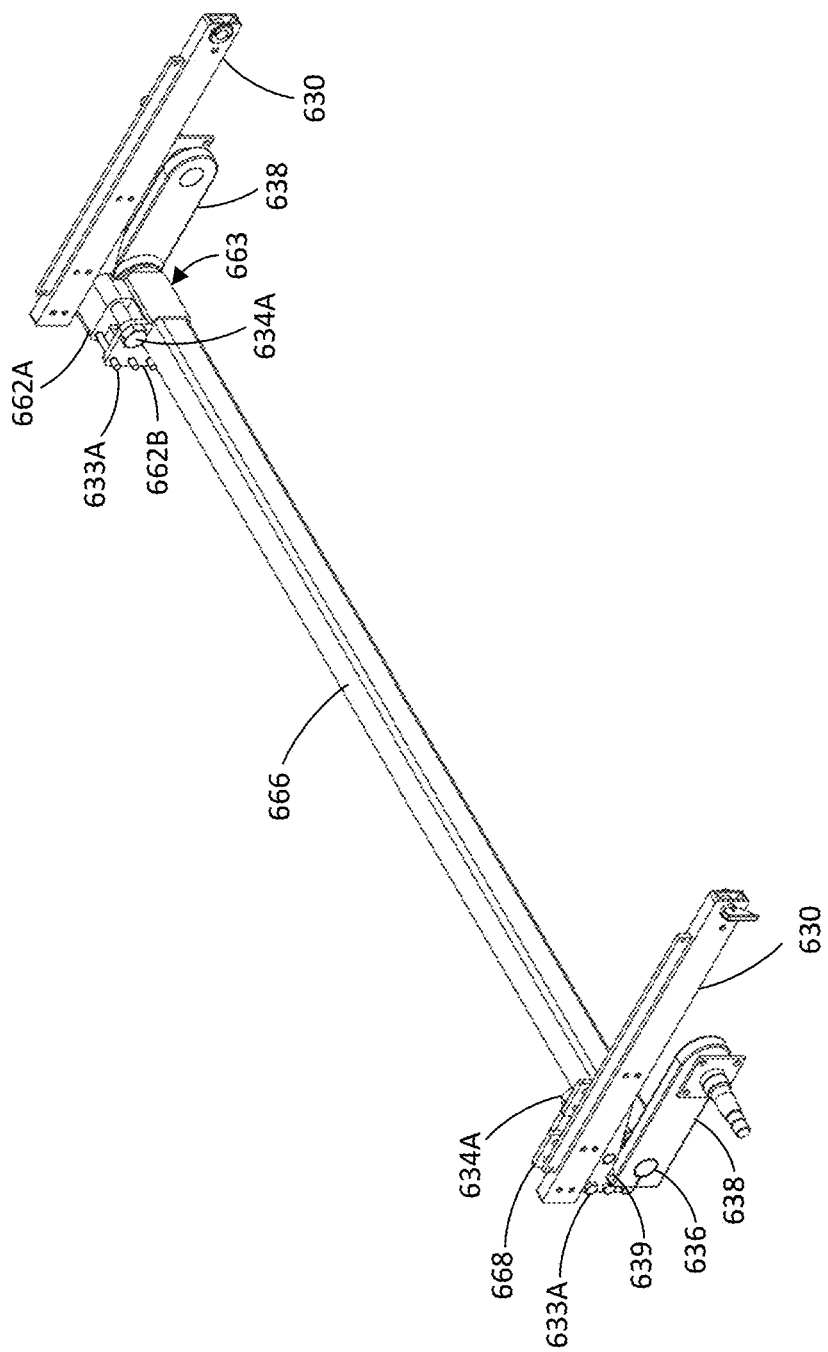
FIG. 6C depicts an isometric view of another embodiment of a positioning arm assembly and an axle tube.

FIG. 6C is a similar view to FIG. 6A with an alternative embodiment of an axle tube mount configuration.

In particular, FIG. 6C depicts an axle mount collar 663 which comprises axle mount plates 662 (including a first axle mount plate 662A, a second axle mount plate 662B). Axle mount collar 663 is fitted by an axial engagement with axle tube 666 and may be secured by an interference fit. Axle mount collar 663 may further be supported by a fastener adapted to pass through the resulting assembly, or by welding.

In some embodiments, axle mount plates 662 are welded to axle mount collar 663. In other embodiments, the axle mount plates are integrally formed with the axle mount collar 663. For example, axle mount plates 662 may be machined from one a single billet of material or formed as an integral component by additive manufacturing. In other integrally formed embodiments, they are constructed by an extrusion process or by a casting process.

An axle pivot bolt 634A connects axle mount collar 663 to chassis mount plate 668 and positioning arm 630. Chassis mount plate 668 is positioned between second axle mount plate 662B and first axle mount plate 662A. In other embodiments, other configurations of mount plates, such as previously described in FIGS. 6A and 6B, may be used.

In alternative embodiments, bearings may used between chassis mount plate 668 and axle mount plates 662 to aid rotation.

Axle pivot bolt 634A may thread into positioning arm 630 or may be secured by other means such as an axle pivot nut. Chassis mount plate 668 connects to the chassis of the trailer.

Axle mount bolts 633A further connect positioning arm 630 to axle mount collar 663 and axle mount plates 662. Suspension arm 638 interfaces with a torsion axle tube 636 as described above. For example, torsion axle tube 636 may have a polygonal cross section where it interfaces with suspension arm 638 and a square cross-section where it connects to axle tube 666.

In this embodiment, suspension arm 638 has horizontal cut out defining two separated arms and an aperture configured to receive torsion axle tube 636 such that suspension arm 638 can slide on and off torsion axle tube 636 for installation and removal. When installed, a compression bolt 639 compresses the arms of suspension arm 638 and securely grips torsion axle tube 636.

Examples of Cable Management for Trailer with Positioning System

FIGS. 7A and 7B depict different isometric and cutaway views of guide ring assembly 144 mounted on the chassis of a trailer (e.g., 100 in FIG. 1A) in a raised position.

FIG. 7A depicts an isometric view of guide ring assembly 144 with a positioning cable (e.g., 178A) traveling through guide ring 155 as viewed from the side of the trailer. Many of the same features described with respect to FIGS. 6A-6B are also visible in FIG. 7A.

Guide ring assembly 144 is a mounting and support structure for guide ring 155 and attaches to the trailer chassis such that the two move as one body. The positioning cable travels through guide ring 155, then travels through a cable cutout 193B in positioning arm 130, where the first end of the positioning cable connects to a latch barrel 192. The positioning cable may be terminated around latch barrel 192.

When the trailer changes position from a raised position to a lowered position, the trailer chassis and guide ring assembly 144 lower while positioning arm 130 rotates upward (and clockwise from the perspective in FIG. 7A).

When the trailer changes from a lowered position to a raised position, the positioning cable positioning arm 130 downward via its connection to latch barrel 192. The positioning cable travels through guide ring 155 as it is pulled. As positioning arm 130 is pulled downward, guide ring assembly 144 and the trailer chassis move upward.

In this embodiment, latch barrel 192 is depicted without a locking mechanism (e.g., 150 in FIG. 5), but may have the locking mechanism in other embodiments.

FIG. 7B depicts a cutaway view of deck 122 and guide ring assembly 144. Deck 122 comprises a deck lower surface 105D which comprises a plurality of trailer deck ribs (e.g., a trailer deck rib 174) that extend downward from trailer deck 122 towards a ground. In this embodiment, trailer deck ribs are shown as an upside-down "T" but may be a different geometry in other embodiments. Generally, trailer deck ribs 174 provide added strength to trailer deck 122, which beneficially reduces or eliminates the need for additional cross-deck supporting elements (e.g., support beams).

Guide ring 155 is held in place between an inner mount plate 154A and an outer mount plate 154B. Mount plates 154A and 154B have a geometry that mates with the exterior of guide ring 155 to securely hold it in place. When assembled, guide ring 155 may be recessed from, flush with, or protrude from the rest of guide ring assembly 144.

In the depicted embodiment, inner mount plate 154A is attached to trailer deck 122 using a mount packer plate 153A, a first deck mount plate 152A, and a second deck mount plate 152B. Mount packer plate 153A has a groove 153B down its center in a lengthwise direction. Groove 153B mates with trailer deck rib 174 on deck lower surface 105D and beneficially adjusts for the rib height. In one embodiment, the trailer deck has a plurality of ribs which protrude from the underside of the trailer deck in an upside-down "T" shape. Groove 153B of mount packer plate 153A contacts the top of the "T" shape of the trailer deck rib. First deck mount plate 152A rests on the "L" shaped channels formed between the top of the "T" shape and its stem on the trailer deck rib 174 that contacts mount packer plate 153A and the neighboring rib. Second deck mount plate 152B is configured similarly but in an orientation that mirrors first deck mount plate 152B on the opposite side of the "T" shape rib. When assembled, deck mount plates 152A and 152B each contact mount packer plate 153A and the three surround the top of the "T" shape of trailer deck rib 174 between them. In other embodiments, inner mount plate 154A is attached to the chassis instead of the trailer deck.

Mount packer plate 153A may be made of various materials and may be made from the similar or different materials than other components of guide ring assembly 144. In one embodiment, mount packer plate 153A is made of metal, such as aluminum or steel. In another embodiment, mount packer plate 153A is made of a plastic such as polyethylene which beneficially allows for a tight assembly. Mount plates 154A and 154B and deck mount plates 152A and 152B may also be made of various materials. In one embodiment, they are made of metal such as aluminum or steel which rigidly hold guide ring 155 in place and mount guide ring assembly 144 securely to the trailer deck.

Guide ring assembly 144 is a transition point for the positioning cable and functions similar to a pulley assembly. However, guide ring assembly 144 has many benefits when compared to a pulley assembly. For example, guide ring assembly 144 is lighter than, quieter than, and has fewer moving parts than a pulley assembly. Thus, guide ring assembly 144 eliminates the need for all pulleys in a positioning arm assembly (e.g., 167), which beneficially reduces potential points of failure and points for maintenance.

Figure 8A:
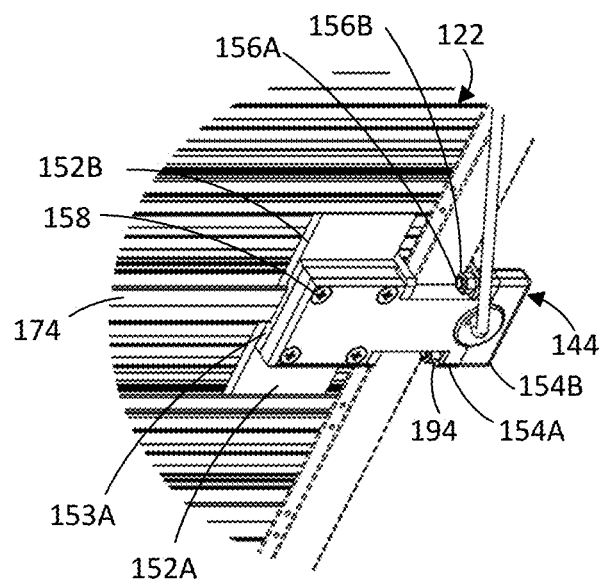
FIGS. 8A-8B depict different isometric and cutout views of aspects of a guide ring assembly connected to a trailer deck.
Figure 8B:
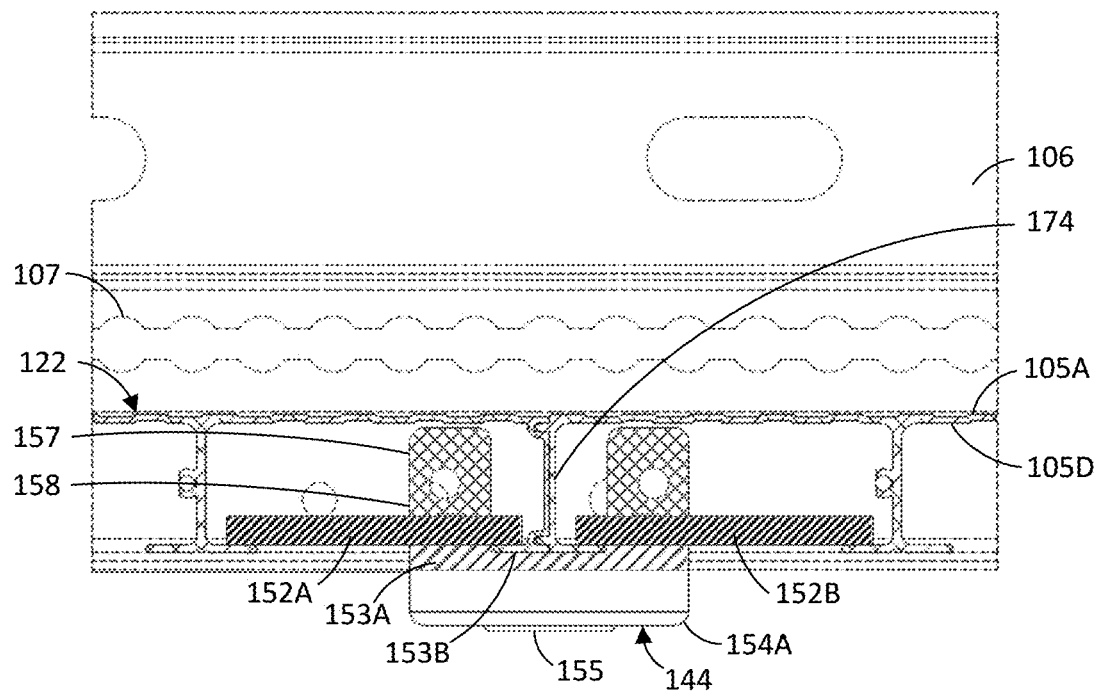

FIGS. 8A and 8B depict different isometric and cutout views of aspects of guide ring assembly 144 connected to the trailer chassis. Many of the same features described with respect to FIGS. 7A and 7B are also visible in FIGS. 8A and 8B.

In particular, FIG. 8A depicts inner mount plate bolts 158 which attach inner mount plate 154A, mount packer plate 153A, first deck mount plate 152A, and second deck mount plate 152B to trailer deck rib 174. In this embodiment, deck mount plate 152A and 152B have threaded thru-holes which inner mount plate bolts 158 thread into, securing guide ring assembly 114 to trailer deck 112. In another embodiment, inner mount plate nuts may be used to secure the assembly. In further embodiments, inner mount plate bolts 158 may thread into trailer deck rib 174, other parts of trailer deck 122, or the chassis (e.g., chassis element 116 in FIG. 1A).

Inner mount plate 154A, outer mount plate 154B, and latch guide plate 194 connect using mount plate bolts 156A and mount plate nuts 156B.

FIG. 8B depicts a cutout view from inside trailer deck 122 looking outward towards rail 106. In particular, FIG. 8B shows a different perspective of FIG. 8A.

Example Guide Ring Assembly

FIGS. 9A and 9B depict different isometric views of guide ring assembly 144. Many of the same features described with respect to FIGS. 7A-8B are also visible in FIGS. 9A and 9B.

FIG. 9A is an exploded isometric view of a guide ring assembly 144. In one embodiment, guide ring 155 is a cylindrical shape and has cut-out around its center axis. The cut-out has a donut-like, convex surface which can accommodate a cable, such as a positioning cable (e.g., 178A in FIG. 7A). The exterior of guide ring 155 has a concave groove cut out along its circumference to allow secure mounting with inner mount plate 154A and outer mount plate 154B. Other embodiments may use different geometries or shapes for guide ring 155.

Guide ring 155 may be made from numerous materials including plastic, such as polyethylene, or metals and metal alloys. Preferably, the convex contact surface of guide ring 155 is resistant to wear, and may comprise metallic coatings such as chrome plating, thermal spray deposition, or low friction material or tape such as polytetrafluoroethylene. The wear resistance allows the positioning cable to contact guide ring 155 with minimal wear. Additionally, synthetic rope may be used as the positioning cable for better performance such as reducing wear while maintaining cable strength.

FIG. 9B depicts an isometric view of guide ring assembly 144 fully assembled.

Notably, guide ring assembly 144 is one example, and other embodiments are possible with similar function. For example, an alternative embodiment of a guide ring assembly may comprise more or fewer components and may mount to other locations of the trailer such as a rail (e.g., 106 in FIG. 10). Further, components of guide ring assembly 144 may be made of additional materials and material combinations other than discussed.

Example Accessories for Trailer with Positioning Features

Figure 10A:
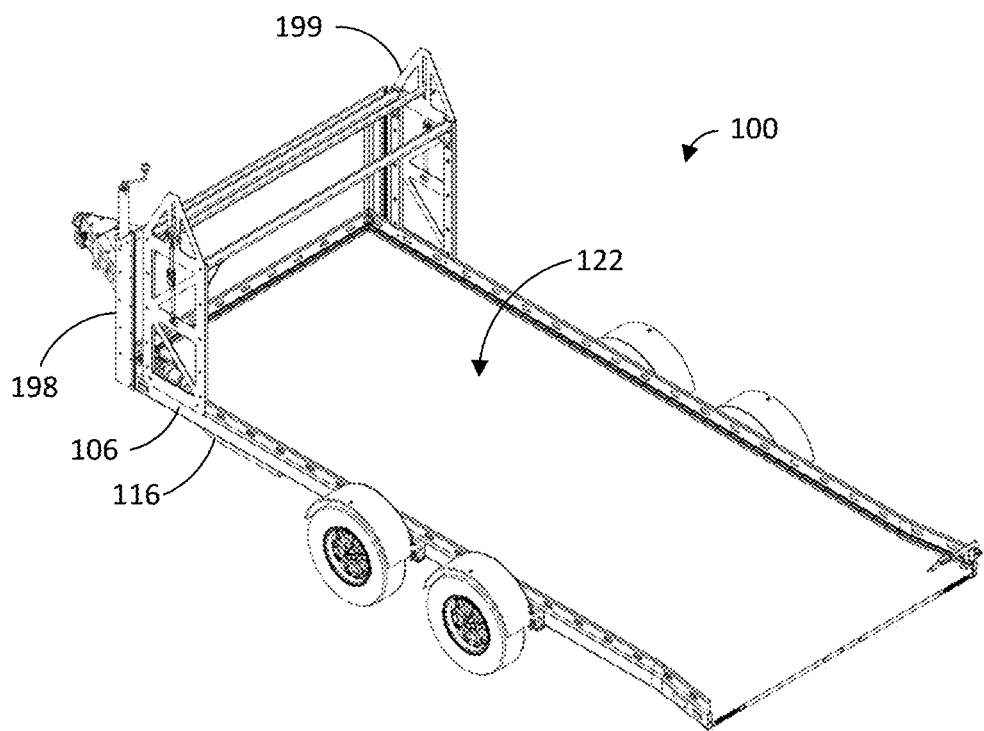
FIGS. 10A-10B depict different isometric and plan views of a trailer in a raised position with an equipment rack and a wind screen installed.
Figure 10B:
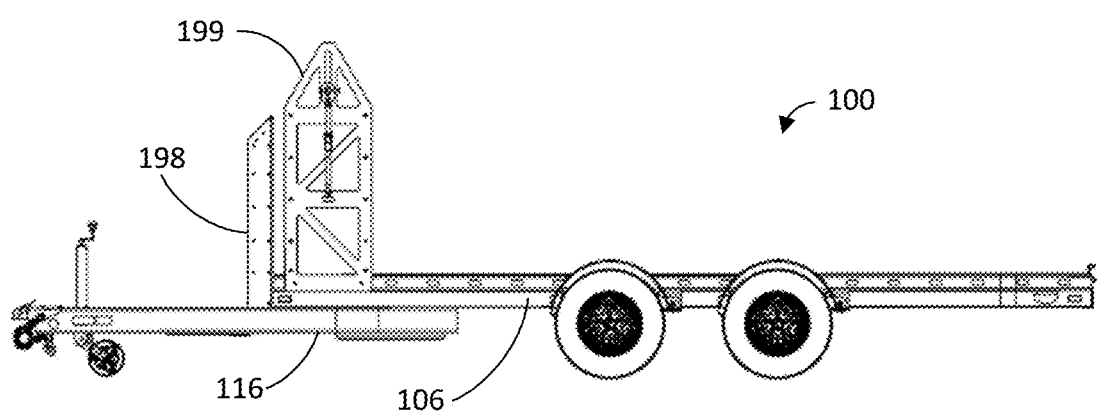

FIGS. 10A and 10B depict different isometric and plan views of trailer 100 in a raised position with various accessories, including an equipment rack 199 and a wind screen 198 installed.

Equipment rack 199 may, for example, be used to carry tires, or fuel containers, or any other equipment a user desires. Though shown with several cross-bars in this embodiment, equipment rack may include shelves or other mounting hardware depending on its particular configuration and use.

Wind screen 198 (alternatively referred to as a rock guard) protects any load on trailer 100 from wind and debris during operation of the trailer. Wind screen 198 may additionally provide aerodynamic improvement for the trailer during operation, such as by directing wind up and around the load.

In this embodiment, equipment rack 199 and wind screen 198 attach to rails 106. In other embodiments, each may individually attach to other parts of the chassis (e.g., chassis element 116) or to trailer deck 122.

FIGS. 11A and 11B depict different plan views of trailer 100 with a trailer deck enclosure 191 installed.

Trailer 100 may be fitted with trailer deck enclosure 191 so that any load is protected from the elements. In some embodiments, the enclosure may be a fabric or other non-rigid material enclosure to lower the weight of the trailer despite providing full cover for the load. The enclosure may have access doors or flaps. For example, an access flap may zip closed or open for access to the interior of the enclosure, or may use a strong hook and loop-type fastener.

In the depicted embodiment, trailer deck enclosure 191 attaches to rails 106. In other embodiments, trailer deck enclosure 191 may attach to other parts of the chassis (e.g., chassis element 116) or to the trailer deck (e.g., 122 in FIG. 1A). Additionally, trailer deck enclosure 191 attaches inside fenders 102, wheels 128, and tires 110 such that it does not contact the positioning subassembly when the trailer is raised and lowered.

Example Trailer Controller

Figure 12:
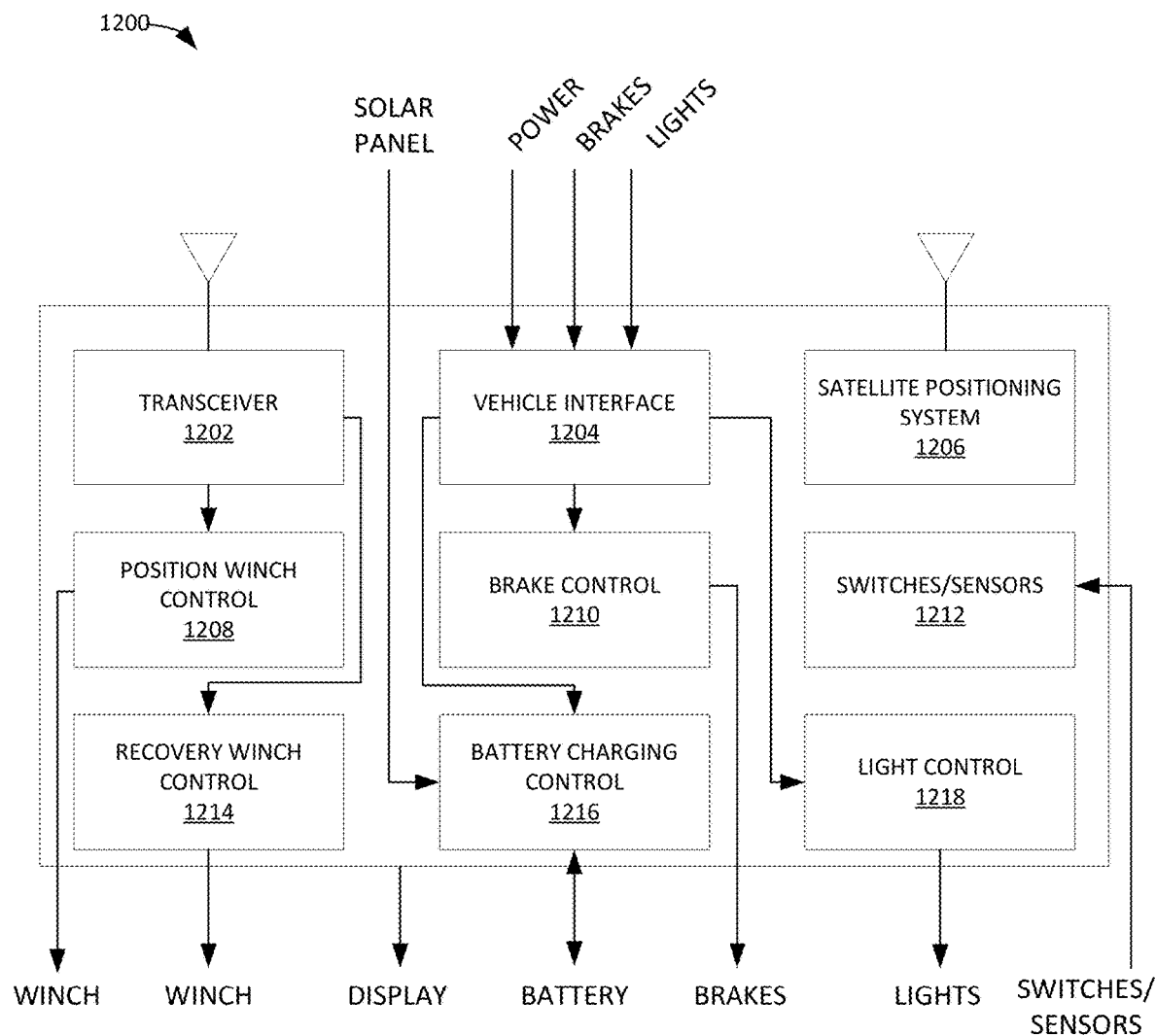
FIG. 12 depicts an example of a trailer controller.

FIG. 12 depicts an example of a trailer controller 1200, which may be configured to control various aspects of the trailer embodiments described herein.

In this embodiment, trailer controller 1200 includes a transceiver 1202 configured to receive wireless control signals, such as from a remote control, or other wireless communication device (e.g., a smartphone running an application). The control signals may be forwarded to position winch control 1208 or recovery winch control 1214 in order to allow remote operation of those winches, as described herein.

Trailer controller 1200 also includes a vehicle interface 1204 configured to receive power, brake signals, and light signals from a vehicle, such as a towing vehicle. Power from the vehicle may be provided to battery charging control 1216 in order to charge one or more batteries onboard a trailer. Power and brake signals may be provided to brake control 1210 in order to control brakes on the trailer (e.g., brakes 126 as described above), such as electrically actuated brakes. Power and light signals may be provided to light control 1218 in order to power and change the state of various lights on a trailer, such as brake lights, parking lights, back-up lights, turning signal lights, and others as described above.

Trailer controller 1200 also includes a satellite positioning system 1206 configured to receive satellite positioning signals and determine a position of the trailer. The position may be provided to transceiver 1202 in order to transmit it to a wide area network (e.g., a cellular network) or other type of network connection in order that the trailer's position may be shared to remote devices and services.

Trailer controller 1200 also includes switches and sensors interface 1212 configured to receive switch and sensor inputs. For example, switches on the trailer may be configured to provide signals to position winch control 1208 and recovery winch control 1214 in order to operate a position winch and recovery winch, respectively. Further, sensors may be provided on a trailer to determine, for example, the position of the trailer (e.g., raised or lowered), whether or not locking mechanisms are engaged (e.g., the locks on the positioning arms, as described above), trailer load sensors, brake health sensors, light health sensors, position sensors, strain sensors, and the like.

In some embodiments, battery charging control 1216 may also receive power from a solar panel on the trailer, such as on an equipment enclosure of the trailer. Battery charging control 1216 may use this power when not connected to a vehicle to keep a battery charged.

Trailer controller 1200 may also include a display output, which may send data to a display, such as a battery status (e.g., voltage) display, which may be arranged on a trailer, such as on an equipment enclosure of the trailer.

Notably, trailer controller 1200 is just one example showing various example functions. Others embodiments are possible. Trailer controller 1200 may generally be implemented with any sort of microcontroller, field programmable gate array (FPGA), low power microcomputer, system on a chip (SoC) or the like.

OTHER CONSIDERATIONS

Persons of skill in the art will appreciate that the specific embodiments described herein are exemplary only, and other embodiments with other combinations of the features described herein are possible and within the scope of this disclosure.

In the preceding description, various parts are described as being connected to or with other elements. Persons of ordinary skill in the art will understand that such connections may generally be direct or indirect based on the context of the description, as in one part may be indirectly connected to another part via an intervening part, unless otherwise stated. Further, one part being connected to another part does not imply a permanent connection unless otherwise stated.

What is claimed is:

1. A trailer, comprising:
a chassis;
a plurality of positioning assemblies, wherein each positioning assembly of the plurality of positioning assemblies comprises:
a positioning arm comprising a positioning cable connection element, wherein:
the positioning arm is configured to move between a first position in which the chassis is in a lowered position and a second position in which chassis is in a raised position via action of a positioning cable attached to the positioning cable connection element, and
the positioning arm is connected to an axle tube; and
a suspension arm connected to a torsion axle tube, wherein the torsion axle tube extends at least partially into the axle tube;
a plurality of positioning cables, wherein each positioning cable of the plurality of positioning cables is connected to at least one positioning arm of one positioning assembly of the plurality of positioning assemblies; and
a device configured to cause the positioning cables to move between a first cable position in which the chassis is in the lowered position and a second cable position in which the chassis is in the raised position.

2. The trailer of claim 1, further comprising:
a plurality of guide ring assemblies,
wherein each guide ring assembly of the plurality of guide ring assemblies is associated with one positioning arm of one positioning assembly of the plurality of positioning assemblies.

3. The trailer of claim 2, wherein each guide ring assembly of the plurality of guide ring assemblies comprises a guide ring through which a positioning cable of the plurality of positioning cables connects to a positioning arm of one positioning assembly of the plurality of positioning assemblies.

4. The trailer of claim 3, wherein:
the chassis comprises a deck, and
each guide ring assembly connects to the deck via a mount plate assembly.

5. The trailer of claim 1, further comprising:
a control cable connected to the device and to a cable connection assembly,
wherein the cable connection assembly is connected to the plurality of positioning cables.

6. The trailer of claim 5, wherein the device comprises a winch.

7. The trailer of claim 1, wherein for each respective positioning assembly of the plurality of positioning assemblies, the positioning arm comprises an aperture configured to allow a positioning cable to connect to the positioning cable connection element through the positioning arm.

8. The trailer of claim 1, wherein each positioning cable of the plurality of positioning cables comprises a synthetic cable.

9. The trailer of claim 1, wherein:
the chassis comprises a deck, and
for each respective positioning assembly of the plurality of positioning assemblies, the positioning arm and the suspension arm of the respective positioning assembly are located outboard of the deck.

10. The trailer of claim 1, wherein for each respective positioning assembly of the plurality of positioning assemblies, the positioning arm is longer than the suspension arm of the respective positioning assembly.

11. The trailer of claim 1, wherein:
the chassis comprises a deck, and
the deck comprises a level portion and an angled portion.

12. The trailer of claim 11, wherein the angled portion of the deck is angled less than or equal to four degrees below a plane formed by the level portion of the deck.

13. The trailer of claim 11, wherein the deck comprises a plurality of deck ribs on a lower surface of the deck.

14. The trailer of claim 11, wherein:
the chassis comprises at least one rail,
the at least one rail connects to at least one side of the deck, and
the at least one rail comprises a track and rail system disposed within the at least one rail.

15. The trailer of claim 6, further comprising: a controller configured to receive remote control signals to control an operation of the winch.

16. The trailer of claim 1, further comprising:
an equipment enclosure;
a solar panel located on a surface of the equipment enclosure;
a battery located within the equipment enclosure; and
a charging circuit located within the equipment enclosure and electrically connected between the solar panel and the battery.

17. The trailer of claim 1, wherein:
the chassis comprises a deck; and
the device is positioned below the deck.

18. The trailer of claim 17, wherein the device is mounted to a bottom surface of the deck via a winch mount plate.

19. The trailer of claim 1, wherein:
the plurality of positioning assemblies comprises four positioning assemblies,
a first subset of the four positioning assemblies is connected to a first axle tube, and
a second subset of the four positioning assemblies is connected to a second axle tube.

20. The trailer of claim 1, wherein:
the plurality of positioning assemblies comprises two positioning assemblies, and the two positioning assemblies are connected to a single axle tube.

* * * * *